US012671521B2

(12) United States Patent
Qin et al.

(10) Patent No.: US 12,671,521 B2
(45) Date of Patent: Jun. 30, 2026

(54) ENCODING AND MODULATION METHOD, DEMODULATION AND DECODING METHOD, AND APPARATUS

(71) Applicant: HUAWEI TECHNOLOGIES CO., LTD., Shenzhen (CN)

(72) Inventors: Kangjian Qin, Hangzhou (CN); Huazi Zhang, Hangzhou (CN); Shengchen Dai, Hangzhou (CN); Bin Li, Shenzhen (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 18/358,492

(22) Filed: Jul. 25, 2023

(65) Prior Publication Data

US 2024/0031058 A1     Jan. 25, 2024

Related U.S. Application Data

(63) Continuation of application No. PCT/CN2022/072336, filed on Jan. 17, 2022.

(30) Foreign Application Priority Data

Jan. 29, 2021   (CN) .......................... 202110130659.9
Aug. 11, 2021   (CN) .......................... 202110924311.7

(51) Int. Cl.
*H04L 1/00*          (2006.01)
(52) U.S. Cl.
CPC .......... *H04L 1/0057* (2013.01); *H04L 1/0061* (2013.01)

(58) Field of Classification Search
CPC ................. H04L 1/0042; H04L 1/0057; H04L 1/0061; H04L 1/0067; H04L 1/0071;
(Continued)

(56) References Cited

U.S. PATENT DOCUMENTS 10,505,674  B2 *  12/2019  Shen .......................... H04L 1/00
11,198,494  B2 *  12/2021  Derginer ................ B63H 20/12
(Continued)

FOREIGN PATENT DOCUMENTS

WO          2020238566 A1    12/2020

OTHER PUBLICATIONS

Guo et al., Multi-CRC Polar Codes and Their Applications, IEEE, 4 pages, Feb. 2016.*
(Continued)

*Primary Examiner* — Frank Duong
(74) *Attorney, Agent, or Firm* — HAUPTMAN HAM, LLP

(57)          ABSTRACT

A transmit-end device obtains a first bit sequence including K information bits (401); then maps the K information bits to m sub-blocks, and performs first polar code encoding on the m sub-blocks to obtain a second bit sequence (402); and modulates the second bit sequence to obtain and send a symbol sequence (403). Correspondingly, a receive-end device obtains the symbol sequence (404), and decodes and demodulates the symbol sequence to obtain the K information bits (405). The m sub-blocks include a first sub-block, a quantity of information bits included in the first sub-block is obtained based on K and a code rate R of the first bit sequence, m may be understood as a modulation order of the first bit sequence, and a length of the second bit sequence is N.

20 Claims, 15 Drawing Sheets

(58) Field of Classification Search
   CPC ............... H04L 1/0076; H03M 13/09; H03M 13/1174; H03M 13/13; H03M 13/251; H03M 13/27; H03M 13/2906; H03M 13/6362
   See application file for complete search history.

(56) References Cited

U.S. PATENT DOCUMENTS

| | | | |
|---|---|---|---|
| 2015/0091742 A1* | 4/2015 | Ionita | H03M 5/18 |
| | | | 341/57 |
| 2015/0092886 A1* | 4/2015 | Ionita | H04L 27/36 |
| | | | 375/298 |
| 2017/0338996 A1* | 11/2017 | Sankar | H04L 1/0041 |
| 2019/0312676 A1 | 10/2019 | Jeong et al. | |
| 2021/0314089 A1* | 10/2021 | Wu | H03M 13/1102 |
| 2022/0085914 A1* | 3/2022 | Yu | H03M 13/251 |
| 2022/0263694 A1* | 8/2022 | Iscan | H04L 25/03929 |
| 2023/0113300 A1* | 4/2023 | Li | H04L 1/1893 |
| | | | 714/726 |

OTHER PUBLICATIONS

International Search Report issued in corresponding International Application No. PCT/CN2022/072336, dated Mar. 22, 2022, pp. 1-10.
Extended European Search Report issued in corresponding European Application No. 22745077.2, dated May 27, 2024, pp. 1-8.

* cited by examiner

UE 1

UE 2

UE 3

Base station

UE 5

UE 6

UE 4

Polarization unit

ENCODING AND MODULATION METHOD, DEMODULATION AND DECODING METHOD, AND APPARATUS

CROSS-REFERENCE TO RELATED APPLICATIONS

This application is a continuation of International Application No. PCT/CN2022/072336, filed on Jan. 17, 2022, which claims priority to Chinese Patent Application No. 202110924311.7, filed on Aug. 11, 2021 and Chinese Patent Application No. 202110130659.9, filed on Jan. 29, 2021. All of the aforementioned patent applications are hereby incorporated by reference in their entireties.

TECHNICAL FIELD

This application relates to the field of communication technologies, and in particular, to an encoding and modulation method, a demodulation and decoding method, and an apparatus.

BACKGROUND

Coding and modulation is a key technology for improving spectral efficiency of a digital communication system. In a future communication system such as a 6th generation (6G) communication system, higher-order modulation brings significant gains and is an alternative technology for future wireless communication.

A processing procedure of multi-level coding (MLC) is as follows: For an m-order modulation, serial-to-parallel conversion is first performed on a to-be-transmitted information bit stream z, to divide the information bit stream z into m bit streams. Each bit stream corresponds to one bit channel in higher-order modulation. Then, polar coding is separately performed on the bit channel. In other words, in an encoding and modulation method related to MLC, m polar code encoders are included. A corresponding codeword output by each polar code encoder forms input of a modulator. For example, a $1^{st}$ codeword output by each polar code encoder may form a $1^{st}$ bit of the modulator.

The foregoing modulation and encoding method usually leads to unsatisfactory performance of modulation and coding.

SUMMARY

This application provides an encoding and modulation method, a demodulation and decoding method, and an apparatus, to improve a code length gain and effectively improve encoding and modulation performance.

According to a first aspect, an embodiment of this application provides an encoding and modulation method. The method includes:

obtaining a first bit sequence, where the first bit sequence includes K information bits, and K is an integer greater than 1; mapping the K information bits to m sub-blocks, and performing first polar code encoding on the m sub-blocks to obtain a second bit sequence, where a quantity of information bits included in a first sub-block is obtained based on K and a code rate R of the first bit sequence, the first sub-block is a sub-block in the m sub-blocks, m is a modulation order of the first bit sequence, a length of the second bit sequence is N, and N is an integer greater than 1; and performing modulation based on the second bit sequence to obtain a symbol sequence, and outputting the symbol sequence.

The first bit sequence may be understood as a bit sequence that contains information and is transmitted. The K information bits may include a cyclic redundancy check (CRC). For example, the m sub-blocks may correspond to m reliability sequences, and one sub-block corresponds to one reliability sequence. For example, reliability sequences corresponding to the sub-blocks may be the same. In this case, it may also be understood that the m sub-blocks correspond to one reliability sequence. For another example, reliability sequences corresponding to at least two sub-blocks may be different.

According to the method provided in this embodiment of this application, the K information bits are mapped to the m sub-blocks, to perform first polar code encoding on the m sub-blocks, so as to obtain the second bit sequence. Therefore, when quantities of information bits to be encoded and modulated are the same, and quantities of symbols (which may also be referred to as quantities of modulated symbols) output by a modulator are the same, a code length gain is effectively improved, and encoding and modulation performance is improved according to the method provided in this embodiment of this application. In addition, a quantity of information bits corresponding to each sub-block is obtained based on K and R, so that the quantity of information bits included in each sub-block can better match a channel capacity of each sub-block.

Optionally, according to the method provided in this embodiment of this application, the m sub-blocks may be further corresponding to at least two different types of bit channels. This improves a case in which encoding and modulation are performed specific to only one type of bit channel, and improves encoding and modulation performance. In addition, the quantity of information bits corresponding to each sub-block is determined by using the foregoing method, so that a bit rate of each sub-block can better meet a capacity of each sub-block generated by channel polarization on m different types of bit channels.

In a possible implementation, the performing first polar code encoding on the m sub-blocks to obtain a second bit sequence includes: performing second polar code encoding on each of the m sub-blocks to obtain m sub-polar codes; and obtaining the second bit sequence based on the m sub-polar codes.

The performing second polar code encoding on each of them sub-blocks does not mean separately performing polar code encoding on the m sub-blocks by m polar code encoders. However, the second polar code encoding is split from the first polar code encoding using a nesting property of a polar code. In other words, although the K information bits may be mapped to the m sub-blocks, the second polar code encoding is still performed on each of them sub-blocks by using one polar code encoder. The performing second polar code encoding on each of the m sub-blocks may be understood as a polar code encoding process, and this implementation does not increase complexity of polar code encoding.

In a possible implementation, the performing modulation based on the second bit sequence to obtain a symbol sequence includes:

performing rate matching on the second bit sequence to obtain a codeword with a length of M, where M is obtained based on m; and modulating the codeword with the length of M to obtain the symbol sequence.

In a possible implementation, positions of the information bits in the first sub-block are determined based on a reliability sequence with the same length as the first sub-block.

In a possible implementation, a length of the first sub-block is N/m.

In a possible implementation, the quantity of information bits included in the first sub-block is less than or equal to a quantity of non-punctured and/or non-shortened information bits.

In a possible implementation, a quantity $u^j$ of information bits included in a $j^{th}$ sub-block meets the following formula:

$$u^j = \begin{cases} \lceil K \times R_j \rceil, & j = m, m-1, \ldots, 2 \\ K - \sum_{i=2}^{i=m} u^i, & j = 1 \end{cases},$$

where $R_j$ represents a code rate allocation function of the $j^{th}$ sub-block, $R_j$ is determined based on the code rate R, and $R_1 + R_2 + \ldots + R_m = 1$.

In a possible implementation, the code rate allocation function $R_j$ of the $j^{th}$ sub-block meets the following formula:

$R_j = p_n \times R^n + p_{n-1} \times R^{n-1} + \ldots + p_1 \times R^1 + p_0 \times R^0$, wherein n is an integer, $R^n$ represents R raised to the power of n, and $p_n$ is a constant.

In a possible implementation, when m=2, the code rate allocation function $R_j$ of the $j^{th}$ sub-block meets the following formula:

$R_j = p_n \times R^n + p_{n-1} \times R^{n-1} + \ldots + p_1 \times R^1 + p_0 \times R^0$, wherein n is an integer, $R^n$ represents R raised to the power of n, and $p_n$ is a constant.

In a possible implementation, when m=2, a code rate allocation function of a $2^{nd}$ sub-block meets the following formula:

when $n=3$, $R_2 = p_3 \times R^3 + p_2 \times R^2 + p_1 \times R^1 + p_0 \times R^0$, wherein $p_3 = 0.6855$, $p_2 = -0.9543$, $p_1 = -0.2042$, and $p_0 = 1.011$; or $p_3 = 0.8462$, $p_2 = -1.704$, $p_1 = 0.4165$, and $p_0 = 0.9453$;

when $n=4$, $R_2 = p_4 \times R^4 + p_3 \times R^3 + p_2 \times R^2 + p_1 \times R^1 + p_0 \times R^0$, where $p_4 = -0.8099$, $p_3 = 2.305$, $p_2 = -2.048$, $p_1 = 0.0796$, and $p_0 = 0.989$; or $p_4 = 0.817$, $p_3 = -0.7891$, $p_2 = -0.5997$, $p_1 = 0.1299$, and $p_0 = 0.9679$;

when $n=2$, $R_2 = p_2 \times R^2 + p_1 \times R^1 + p_0 \times R^0$, where $p_2 = 0.07398$, $p_1 = -0.6434$, and $p_0 = 1.06$; or $p_2 = -0.4346$, $p_1 = -0.1256$, and $p_0 = 1.005$; and when $n=1$, $R_2 = p_1 \times R^1 + p_0 \times R^0$, where $p_1 = -0.5697$, and $p_0 = 1.046$; or $p_1 = -0.5602$, and $p_0 = 1.086$.

According to a second aspect, an embodiment of this application provides a demodulation and decoding method. The method includes:

obtaining a symbol sequence, where the symbol sequence is obtained by performing modulation based on a second bit sequence, a length of the second bit sequence is N, N is an integer greater than 1, the second bit sequence is a bit sequence obtained by mapping K information bits included in a first bit sequence to m sub-blocks and performing first polar code encoding on the m sub-blocks, a quantity of information bits included in a first sub-block is obtained based on K and a code rate R of the first bit sequence, the first sub-block is a sub-block in the m sub-blocks, and m is a modulation order of the first bit sequence; and demodulating and decoding the symbol sequence to obtain the K information bits.

In a possible implementation, that the second bit sequence is a bit sequence obtained by mapping K information bits included in a first bit sequence to m sub-blocks and performing first polar code encoding on the m sub-blocks includes: the second bit sequence is a bit sequence obtained based on m sub-polar codes that are obtained by mapping the K information bits to the m sub-blocks and performing second polar code encoding on each of the m sub-blocks.

In a possible implementation, positions of the information bits in the first sub-block are determined based on a reliability sequence with the same length as the first sub-block.

In a possible implementation, a length of the first sub-block is N/m.

In a possible implementation, the quantity of information bits included in the first sub-block is less than or equal to a quantity of non-punctured and/or non-shortened information bits.

In a possible implementation, a quantity $u^j$ of information bits included in a $j^{th}$ sub-block meets the following formula:

$$u^j = \begin{cases} \lceil K \times R_j \rceil, & j = m, m-1, \ldots, 2 \\ K - \sum_{i=2}^{i=m} u^i, & j = 1 \end{cases},$$

where $R_j$ represents a code rate allocation function of the $j^{th}$ sub-block, $R_j$ is determined based on the code rate R, and $R_1 + R_2 + \ldots + R_m = 1$.

In a possible implementation, the code rate allocation function $R_j$ of the $j^{th}$ sub-block meets the following formula:

$R_j = p_n \times R^n + p_{n-1} \times R^{n-1} + \ldots + p_1 \times R^1 + p_0 \times R^0$, where n is an integer, $R^n$ represents R raised to the power of n, and $p_n$ is a constant.

In a possible implementation, when m=2, the code rate allocation function $R_j$ of the $j^{th}$ sub-block meets the following formula:

$R_j = p_n \times R^n + p_{n-1} \times R^{n-1} + \ldots + p_1 \times R^1 + p_0 \times R^0$, where n is an integer, $R^n$ represents R raised to the power of n, and $p_n$ is a constant.

In a possible implementation, when m=2, a code rate allocation function of a $2^{nd}$ sub-block meets the following formula:

when $n=3$, $R_2 = p_3 \times R^3 + p_2 \times R^2 + p_1 \times R^1 + p_0 \times R^0$, wherein $p_3 = 0.6855$, $p_2 = -0.9543$, $p_1 = -0.2042$, and $p_0 = 1.011$; or $p_3 = 0.8462$, $p_2 = -1.704$, $p_1 = 0.4165$, and $p_0 = 0.9453$;

when $n=4$, $R_2 = p_4 \times R^4 + p_3 \times R^3 + p_2 \times R^2 + p_1 \times R^1 + p_0 \times R^0$, where $p_4 = -0.8099$, $p_3 = 2.305$, $p_2 = -2.048$, $p_1 = 0.0796$, and $p_0 = 0.989$; or $p_4 = 0.817$, $p_3 = -0.7891$, $p_2 = -0.5997$, $p_1 = 0.1299$, and $p_0 = 0.9679$;

when $n=2$, $R_2 = p_2 \times R^2 + p_1 \times R^1 + p_0 \times R^0$, where $p_2 = 0.07398$, $p_1 = -0.6434$, and $p_0 = 1.06$; or $p_2 = -0.4346$, $p_1 = -0.1256$, and $p_0 = 1.005$; and when $n=1$, $R_2 = p_1 \times R^1 + p_0 \times R^0$, where $p_1 = -0.5697$, and $p_0 = 1.046$; or $p_1 = -0.5602$, and $p_0 = 1.086$.

It may be understood that for beneficial effects of the first aspect or the second aspect, refer to the following descriptions. Details are not described herein.

According to a third aspect, an embodiment of this application provides a communication apparatus, configured to perform the method in any one of the first aspect or the possible implementations of the first aspect. The communication apparatus includes corresponding units configured to perform the method in any one of the first aspect or the possible implementations of the first aspect.

For example, the communication apparatus may be a transmit-end device, a chip in a transmit-end device, or the like.

According to a fourth aspect, an embodiment of this application provides a communication apparatus, configured to perform the method in any one of the second aspect or the possible implementations of the second aspect. The communication apparatus includes corresponding units configured to perform the method in any one of the second aspect or the possible implementations of the second aspect.

For example, the communication apparatus may be a receive-end device, a chip in a receive-end device, or the like.

In the third aspect or the fourth aspect, the communication apparatus may include an input/output unit and a processing unit. For specific descriptions of the input/output unit and the processing unit, refer to apparatus embodiments shown below.

According to a fifth aspect, an embodiment of this application provides a communication apparatus. The communication apparatus includes a processor, configured to perform the method in any one of the first aspect or the possible implementations of the first aspect. Alternatively, the processor is configured to execute a program stored in a memory. When the program is executed, the method in any one of the first aspect or the possible implementations of the first aspect is performed.

In a process of performing the foregoing method, a process of sending information or outputting information (for example, a symbol sequence) or obtaining information (for example, obtaining a first bit sequence) in the foregoing method may be understood as a process of outputting the information by a processor or a process of receiving the input information by a processor. When outputting the information, the processor outputs the information to a transceiver, so that the transceiver transmits the information. After the information is output by the processor, other processing may further be performed on the information before the information arrives at the transceiver. Similarly, when the processor receives the foregoing input information, the transceiver receives the information, and inputs the information into the processor. Further, after the transceiver receives the foregoing information, other processing may be performed on the information before the information is input into the processor.

Based on the foregoing principle, for example, obtaining a first bit sequence mentioned in the foregoing method may be understood as receiving an input first bit sequence by the processor. The outputting a symbol sequence mentioned in the foregoing method may be understood as outputting a symbol sequence by the processor, or the like.

Unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

In an implementation process, the processor may be a processor specially configured to perform these methods, or a processor, for example, a general-purpose processor, that executes computer instructions in the memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application. It may be understood that descriptions of the processor and the memory are also applicable to the sixth aspect shown below. For brevity, descriptions of the processor and the memory are not described in detail in the sixth aspect.

In a possible implementation, the memory is located outside the communication apparatus.

In a possible implementation, the memory is located inside the communication apparatus.

In this embodiment of this application, the processor and the memory may alternatively be integrated into one device. In other words, the processor and the memory may alternatively be integrated together.

For example, the memory may be configured to store a reliability sequence or the like.

In a possible implementation, the communication apparatus further includes a transceiver. The transceiver is configured to receive or send a signal. For example, the transceiver may be further configured to send a symbol sequence or the like.

In this embodiment of this application, the communication apparatus may be a transmit-end device, a chip in a transmit-end device, or the like.

According to a sixth aspect, an embodiment of this application provides a communication apparatus. The communication apparatus includes a processor, configured to perform the method in any one of the second aspect or the possible implementations of the second aspect. Alternatively, the processor is configured to execute a program stored in a memory. When the program is executed, the method in any one of the second aspect or the possible implementations of the second aspect is performed.

In a possible implementation, the memory is located outside the communication apparatus.

In a possible implementation, the memory is located inside the communication apparatus.

In this embodiment of this application, the processor and the memory may alternatively be integrated into one device. In other words, the processor and the memory may alternatively be integrated together. For example, the memory may be configured to store a reliability sequence or the like.

In a possible implementation, the communication apparatus further includes a transceiver. The transceiver is configured to receive or send a signal. For example, the transceiver may be configured to receive a symbol sequence or the like.

In this embodiment of this application, the communication apparatus may be a receive-end device, a chip in a receive-end device, or the like.

According to a seventh aspect, an embodiment of this application provides a communication apparatus. The communication apparatus includes a logic circuit and an interface, and the logic circuit is coupled to the interface. The interface is configured to input a first bit sequence. The logic circuit is configured to map K information bits included in the first bit sequence to m sub-blocks, perform first polar code encoding on the m sub-blocks to obtain a second bit sequence, and perform modulation based on the second bit sequence to obtain a symbol sequence. The interface is further configured to output the symbol sequence.

For example, the logic circuit is specifically configured to: perform second polar code encoding on each of the m sub-blocks to obtain m sub-polar codes; and obtain the second bit sequence based on the m sub-polar codes.

It may be understood that, for descriptions of the first bit sequence, second bit sequence, sub-block, first polar code encoding, and the like, refer to the descriptions in the first aspect or refer to the following embodiments. Details are not described herein.

According to an eighth aspect, an embodiment of this application provides a communication apparatus. The communication apparatus includes a logic circuit and an interface, and the logic circuit is coupled to the interface. The interface is configured to obtain a symbol sequence. The logic circuit is configured to demodulate and decode the symbol sequence to obtain the K information bits.

It may be understood that, for descriptions of the first bit sequence, second bit sequence, sub-block, first polar code encoding, and the like, refer to the descriptions in the second aspect or refer to the following embodiments. Details are not described herein.

According to a ninth aspect, an embodiment of this application provides a computer-readable storage medium. The computer-readable storage medium is used to store a computer program. When the computer program is run on a computer, the method in any one of the first aspect or the possible implementations of the first aspect is performed, or the method in any one of the second aspect or the possible implementations of the second aspect is performed.

According to a tenth aspect, an embodiment of this application provides a computer program product. The computer program product includes a computer program or computer code. When the computer program product runs on a computer, the method in any one of the first aspect or the possible implementations of the first aspect is performed, or the method in any one of the second aspect or the possible implementations of the second aspect is performed.

According to an eleventh aspect, an embodiment of this application provides a computer program. When the computer program is run on a computer, the method in any one of the first aspect or the possible implementations of the first aspect is performed, or the method in any one of the second aspect or the possible implementations of the second aspect is performed.

According to a twelfth aspect, an embodiment of this application provides a wireless communication system. The wireless communication system includes a transmit-end device and a receive-end device. The transmit-end device is configured to perform the method in any one of the first aspect or the possible implementations of the first aspect. The receive-end device is configured to perform the method in any one of the second aspect or the possible implementations of the second aspect.

DESCRIPTION OF EMBODIMENTS

Figure 1A:
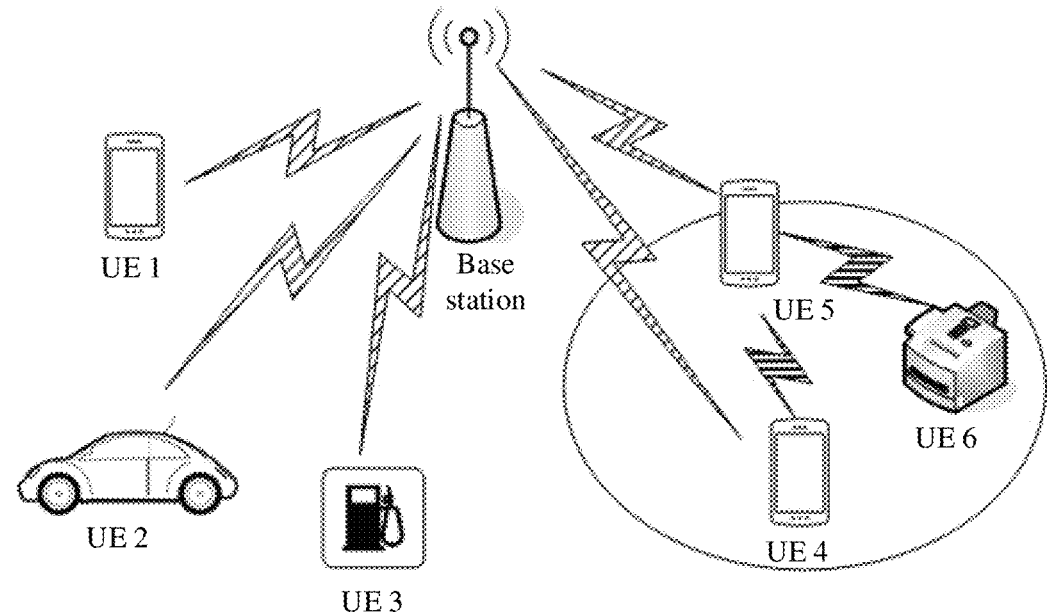
FIG. 1a is a schematic diagram of an architecture of a communication system according to an embodiment of this application.

To make objectives, technical solutions, and advantages of this application clearer, the following further describes this application with reference to the accompanying drawings.

In the specification, claims, and the accompanying drawings of this application, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

An "embodiment" mentioned in this specification means that a particular feature, structure, or characteristic described with reference to this embodiment may be included in at least one embodiment of this application. This term appearing in various parts of the specification not necessarily refers to the same embodiment, nor an independent or alternative embodiment that is mutually exclusive to other embodiments. A person skilled in the art can explicitly and implicitly understand that the embodiments described herein may be combined with other embodiments.

In this application, "at least one (item)" means one or more, "a plurality of" means two or more, "at least two (items)" means two, three, or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items. For example, at least one (piece) of a, b, or c may represent: a, b, c, a and b, a and c, b and c, or a, b, and c.

The technical solutions provided in this application may be applied to various communication systems, for example, a long term evolution (LTE) system, an LTE frequency division duplex (FDD) system, an LTE time division duplex (TDD) system, an internet of things (IoT) system, a narrow band-internet of things (NB-IoT) system, wireless fidelity (Wi-Fi), a 5th generation (5G) communication system or new radio (NR), and other future communication systems.

The technical solutions provided in this application may be further applied to machine type communication (MTC), a long term evolution-machine (LTE-M) communication technology, a device-to-device (D2D) network, a machine to machine (M2M) network, an internet of things (IoT) network, or another network. The IoT network may include, for example, an internet of vehicles. Communication modes in an internet of vehicles system are collectively referred to as vehicle to X (V2X, where X may represent anything). For example, V2X may include vehicle to vehicle (V2V) communication, vehicle to infrastructure (V2I) communication, vehicle to pedestrian (V2P) communication, or vehicle to network (V2N) communication.

The following describes terms in this application in detail.

1. Terminal Device

A terminal device in this application is an apparatus having a wireless transceiver function. The terminal device may communicate with an access network device (or may be referred to as an access device) in a radio access network (RAN).

The terminal device may also be referred to as user equipment (UE), an access terminal, a terminal, a subscriber unit, a subscriber station, a mobile station, a remote station, a remote terminal, a mobile device, a user terminal, a user agent, a user apparatus, or the like. In a possible implementation, the terminal device may be deployed on land, including an indoor device, an outdoor device, a handheld device, or a vehicle-mounted device; or may be deployed on the water surface (for example, on a ship); or may be deployed in the air (for example, on an unmanned aerial vehicle, an airplane, a balloon, or a satellite). In a possible implementation, the terminal device may be a handheld device, a vehicle-mounted device, a wearable device, a sensor, a terminal in the internet of things, a terminal in the internet of vehicles, a terminal device in any form in a fifth generation (5G) network, or a future network that has a wireless communication function. This is not limited in this application.

It may be understood that the terminal device shown in this application may include not only a vehicle (for example, an entire vehicle) in the internet of vehicles, but also a vehicle-mounted device, a vehicle-mounted terminal, or the like in the internet of vehicles. A specific form of the terminal device applied to the internet of vehicles is not limited in this application.

It may be understood that the terminal device shown in this application may further communicate with another terminal device by using a technology such as D2D, V2X, or M2M. A method for communication between terminal devices is not limited in this application.

2. Network Device

The network device in this application may be an apparatus that is deployed in the radio access network to provide a wireless communication service for a terminal device. The network device may also be referred to as an access network device, an access device, a RAN device, or the like.

The network device may include but is not limited to: a next generation NodeB (gNB) in the 5G system, an evolved NodeB (eNB) in the LTE system, a radio network controller (RNC), a NodeB (NB), a base station controller (BSC), a base transceiver station (BTS), a home base station (a home evolved NodeB or a home NodeB, HNB), a baseband unit (BBU), a transmission reception point (transmission and reception point, TRP), a transmitting point (TP), a pico, a mobile switching center, or a network device in a future network. The network device may also be a device carrying a base station function in a non-terrestrial communication system, D2D, V2X or M2M. A specific type of the network device is not limited in this application. In systems of different radio access technologies, devices having functions of the network device may have different names.

Optionally, in some deployments of the network device, the network device may include a central unit (CU) and a distributed unit (DU). In some other deployments of the network device, the CU may be further divided into a CU-control plane (CP), a CU-user plane (UP), and the like. In some other deployments of the network device, the network device may alternatively be an open radio access network (ORAN) architecture or the like. A specific deployment manner of the network device is not limited in this application.

Based on the terminal device and the network device described above, an embodiment of this application provides a communication system. FIG. 1a is a schematic diagram of a communication system according to an embodiment of this application. As shown in FIG. 1a, the communication system may include at least one network device, for example, a base station in FIG. 1a, and at least one terminal device, for example, UE 1 to UE 6 in FIG. 1a.

For example, terminal devices may directly communicate with each other. For example, the direct communication between the terminal devices may be implemented by using a D2D technology. As shown in FIG. 1a, direct communication may be performed between the UE 4 and the UE 5 and between the UE 4 and the UE 6 by using the D2D technology. The UE 4 or the UE 6 may separately or simultaneously communicate with the UE 5. For another example, the UE 4 to the UE 6 may separately communicate with the network device. For example, the UE 4 or the UE 6 may directly communicate with the network device, or may indirectly communicate with the network device. For example, the UE 6 may communicate with the network device via the UE 5.

It should be understood that, FIG. 1a shows an example of one network device, a plurality of terminal devices, and communication links between the communication devices. Optionally, the communication system may include a plurality of network devices, and another quantity of terminal devices, for example, more or fewer terminal devices may be included in coverage of each network device. This is not limited in this application.

A plurality of antennas may be configured for the foregoing communication devices, such as the base station and the UE 1 to the UE 6 in FIG. 1a. The plurality of antennas may include at least one transmit antenna configured to send a signal, at least one receive antenna configured to receive a signal, and the like. A specific structure of each communication device is not limited in embodiments of this application. Optionally, the communication system may further include another network entity such as a network controller or a mobility management entity. This is not limited in embodiments of this application.

3. Reliability Sequence

A polar code is designed for an independent and identically distributed channel, and features high performance, low complexity, and a flexible matching manner, and the like.

Position numbers of elements in the reliability sequence are sorted, that is, the reliability sequence is a sequence in which position numbers are sorted in ascending order of reliability. A reliability sequence $A=[a_1, a_2, \ldots, a_N]$ with a length of N, where $a_1$ at the first position is a position number with lowest reliability, and $a_N$ at the last position is a position number with highest reliability. Certainly, a sequence in which position numbers are sorted in descending order of reliability may also be used. Because the essence is the same, an example in which position numbers are sorted in ascending order of reliability is used for description in this application.

Figure 2A:
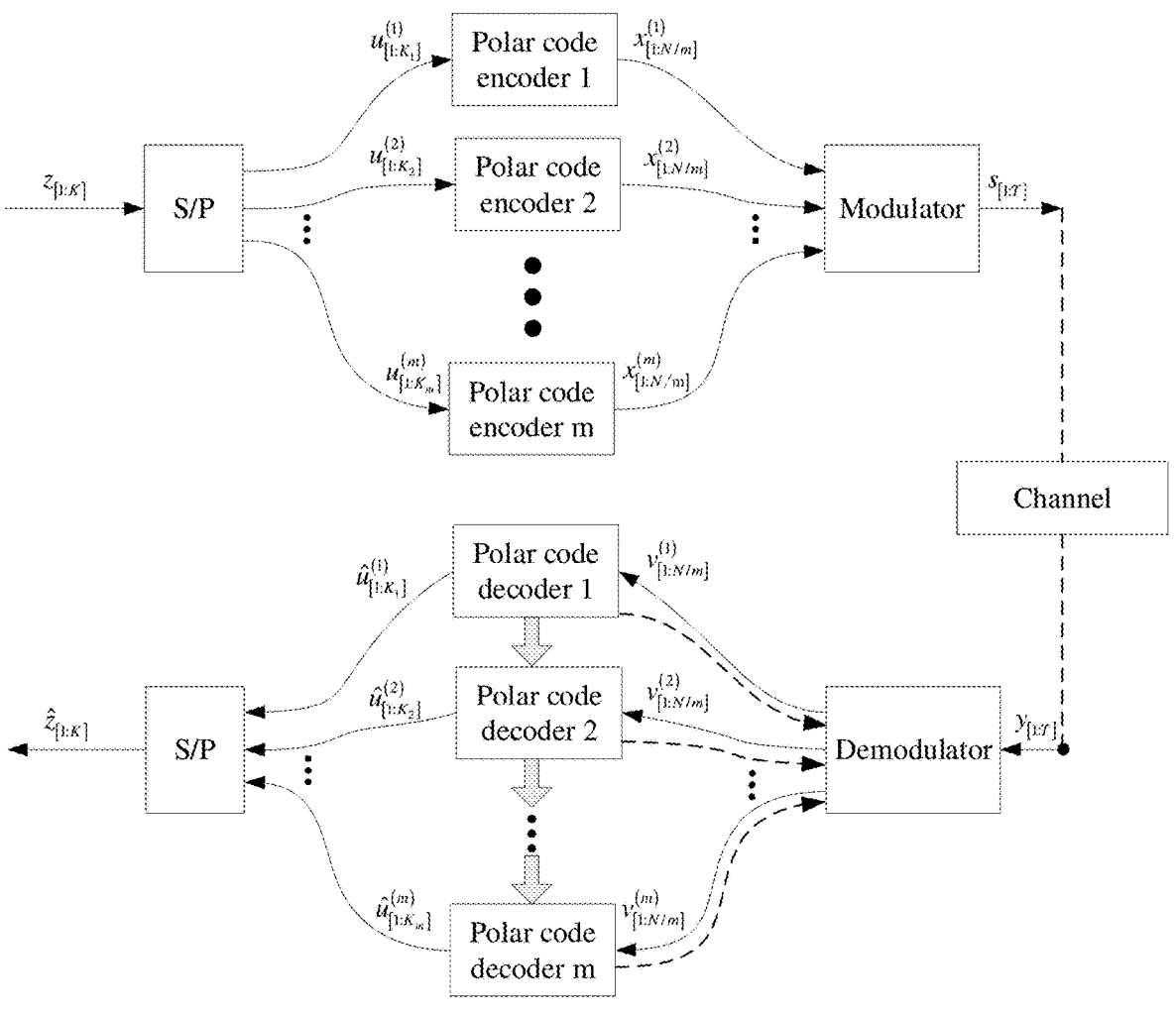
FIG. 2a to FIG. 2c are schematic flowcharts of encoding and modulation, demodulation and decoding according to an embodiment of this application.
Figure 2B:
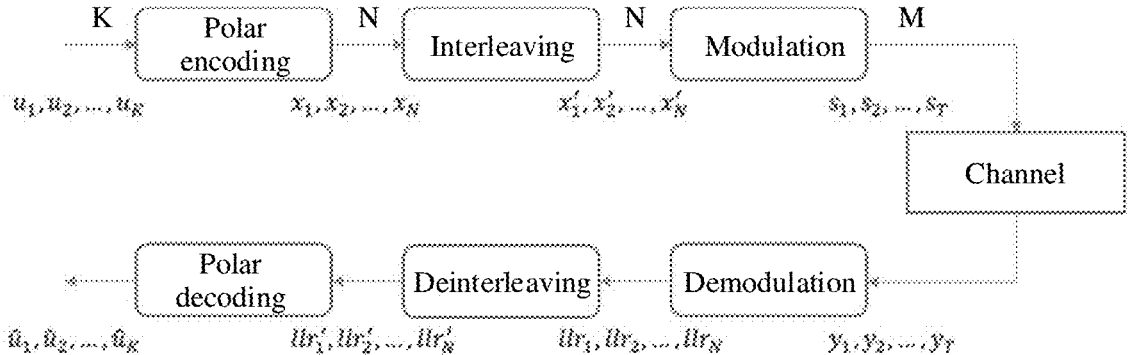
Figure 2C:
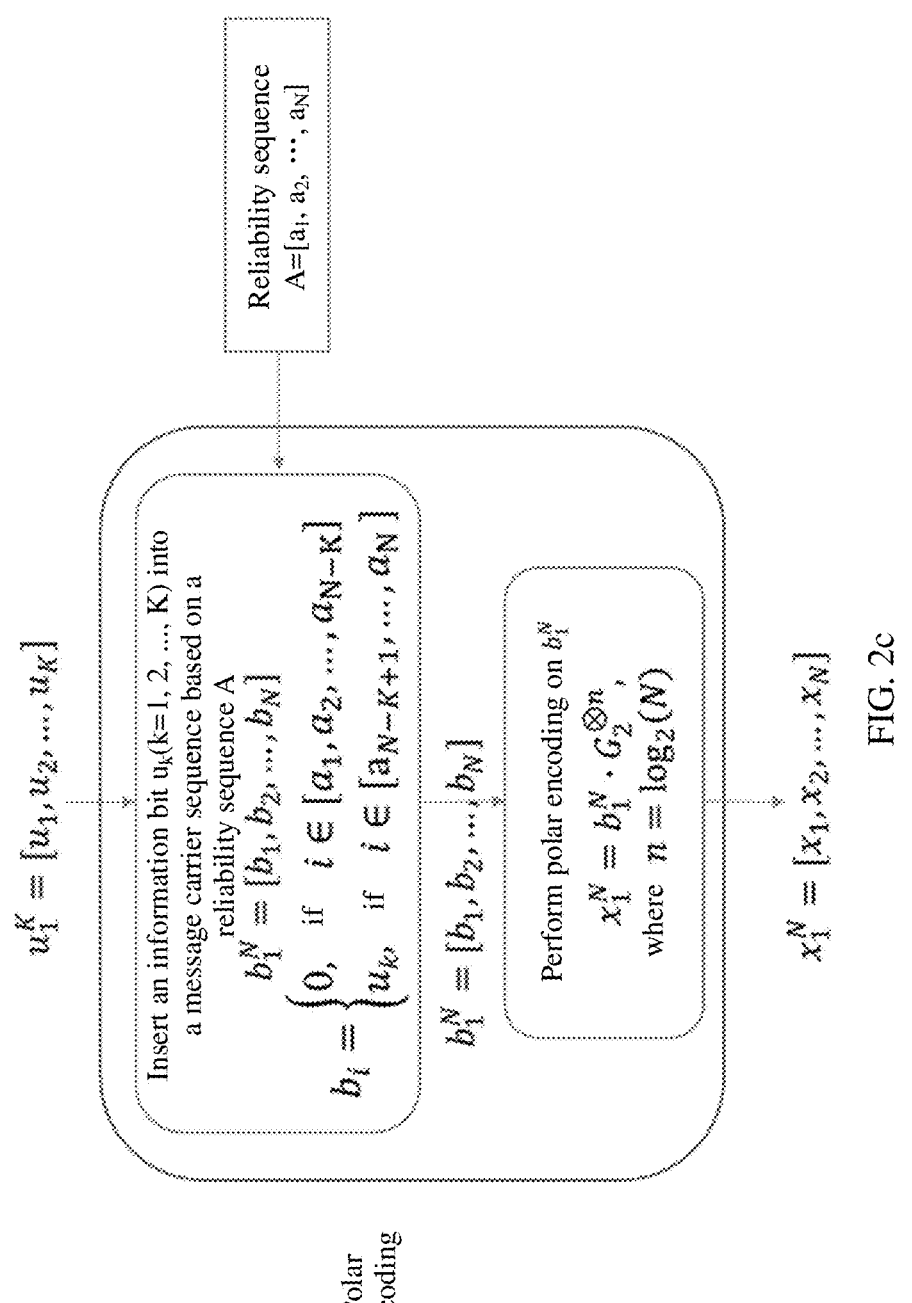

As shown in FIG. 2c, given an information bit stream with a length of K and a reliability sequence A=[$a_1$, $a_2$, . . . , $a_N$] with a length of N, K message bits may be placed in the K most reliable positions [$a_{N-K+1}$, . . . , $a_N$] in A, and frozen bits (for example, 0) are placed in the remaining (N−K) positions [$a_1$, . . . , $a_{N-K}$] in A, so as to obtain a message carrier sequence [$b_1$, $b_2$, . . . , $b_N$]. In an actual application, for example, in a 3GPP NR standard, when puncturing (puncture) or shortening (shorten) further is performed, positions to be shortened or punctured further are selected first. Some pre-frozen positions further are selected during puncturing, and then the K most reliable positions are selected from remaining positions. This is not limited in this application.

4. Serial Demodulation and Parallel Demodulation

Demodulation is a process of converting a modulated symbol into a bit sequence corresponding to the modulated symbol. Demodulation may be classified into serial demodulation and parallel demodulation. A 4-PAM is used as an example. One 4-PAM symbol s may correspond to two bits such as V1 and V2. In this case, a received symbol obtained after s is processed on a channel may be y. Therefore, the serial demodulation may be understood as: first estimating $V_1$ based on the received symbol y, and then further estimating $V_2$ by using $V_1$ and y. When the parallel demodulation is used to obtain $V_2$, $V_1$ is not needed. In other words, $V_1$ and $V_2$ may be obtained at the same time and implemented in parallel.

Figure 1B:
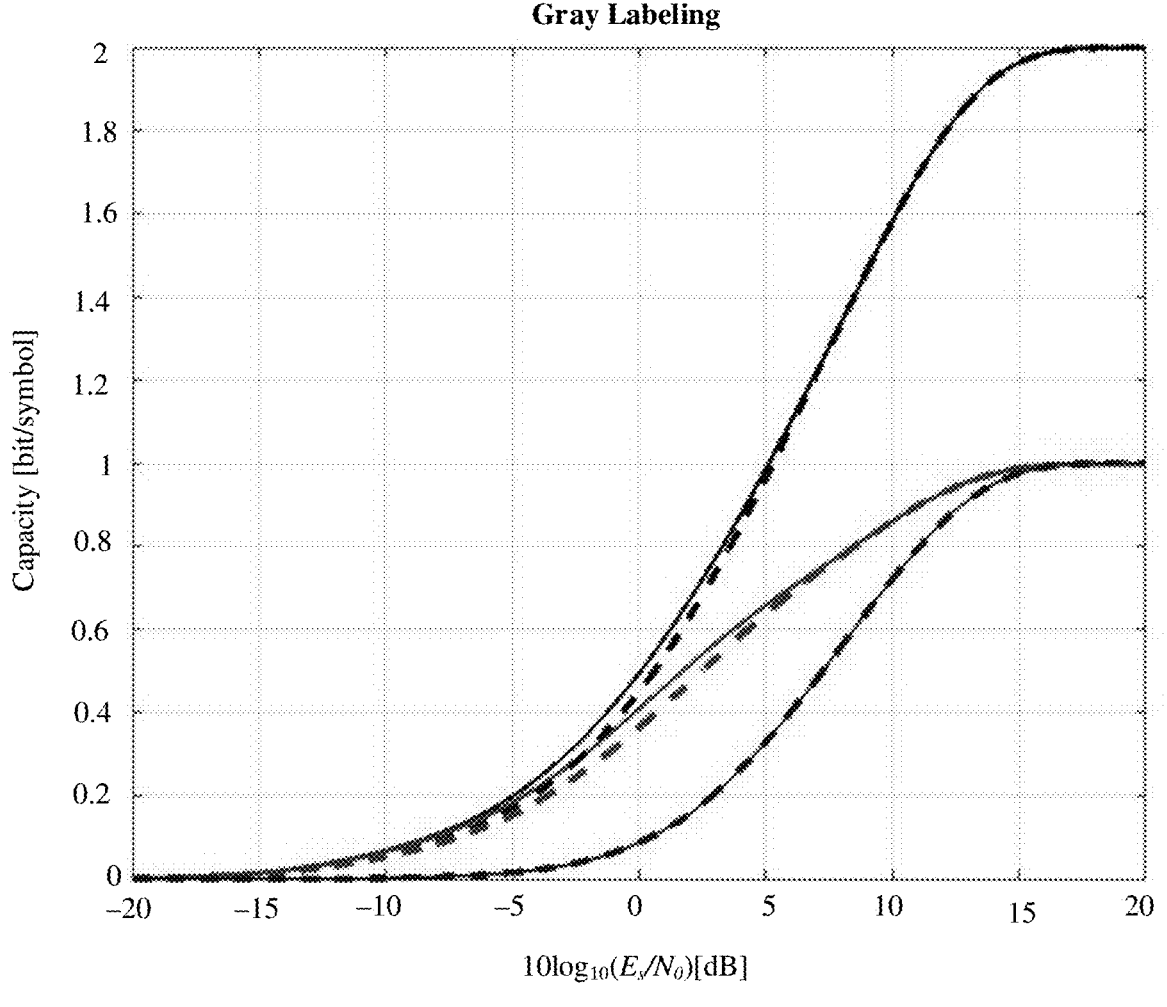
FIG. 1b is a comparison curve graph of bit channel capacities in serial demodulation and parallel demodulation according to an embodiment of this application.

FIG. 1b is a comparison curve graph of bit channel capacities in serial demodulation and parallel demodulation. For a specific process of serial demodulation and parallel demodulation, refer to a related technical standard or protocol. Details are not described in this application.

In FIG. 1b, the abscissa may represent a signal-to-noise ratio (SNR), and the ordinate represents a channel capacity. The first solid line from bottom to top indicates bit channel capacities of $V_1$ in serial demodulation, the second solid line indicates bit channel capacities of $V_2$ in serial demodulation, and the third solid line indicates modulated channel capacities in serial demodulation. The first dashed line from bottom to top indicates bit channel capacities of $V_1$ in parallel demodulation, the second dashed line indicates bit channel capacities of $V_2$ in parallel demodulation, and the third dashed line indicates modulated channel capacities in parallel demodulation.

With reference to FIG. 1b, in serial demodulation, a bit channel capacity of $V_1$+a bit channel capacity of $V_2$=a modulated channel capacity in serial demodulation, while in parallel demodulation, a bit channel capacity of $V_1$+a bit channel capacity of $V_2$<a modulated channel capacity in serial demodulation. In other words, parallel demodulation has a specific capacity loss compared with serial demodulation. Parallel demodulation is easy to implement and can achieve parallel processing.

More generally, it can be learned with reference to FIG. 1b that, in both cases of parallel demodulation and serial demodulation, one m-order modulated channel (or referred to as an m-order modulated symbol) may generate m different types of bit channels.

5. Multi-Level Coding (MLC)

FIG. 2a shows an example of an MLC processing process. As shown in FIG. 2a, first, serial-to-parallel conversion (serial/parallel, S/P) is performed on an information bit stream z (for example, an information bit stream $z_{[1, K]}$ including K bits in FIG. 2a), and then the information bit stream is divided into m bit streams such as $$u_{[1:K_1]}^{(1)}, u_{[1:K_2]}^{(2)}, \ldots, \text{ and } u_{[1:K_m]}^{(m)}.$$

Each bit stream may correspond to one bit channel in higher-order modulation. For example, $$u_{[1:K_1]}^{(1)}$$

includes $K_1$ bits, $$u_{[1:K_2]}^{(2)}$$

includes $K_2$ bits, and $$u_{[1:K_m]}^{(m)}$$

includes $K_m$ bits. Then, polar code encoding is performed on each bit channel, for example, m polar code encoders in FIG. 2a are used, such as a polar code encoder 1, a polar code encoder 2, . . . , and a polar code encoder m. Each polar code encoder outputs, based on an input bit stream, a codeword with a length of N/m, for example, $$x_{[1:N/m]}^{(1)}, x_{[1:N/m]}^{(2)}, \ldots,$$

or $$x_{[1:N/m]}^{(m)}.$$

For example, a $1^{st}$ codeword output by each polar code encoder may constitute a $1^{st}$ bit input into a modulator, a $2^{nd}$ codeword output by each polar code encoder constitutes a $2^{nd}$ bit input into the modulator, and an $(N/m)^{th}$ codeword output by each polar code encoder constitutes an $(N/m)^{th}$ bit input into the modulator. In this way, the foregoing N bits are input into the modulator, and T modulated symbols such as $s_{[1:T]}$ are output. The T modulated symbols may be transmitted over a channel. For example, T=N/m.

Correspondingly, a demodulator first receives a sequence $y_{[1:T]}$ through a channel, to demodulate a soft value $$v_{[1:N/m]}^{(1)}$$

required by a polar code decoder 1. Then, the polar code decoder 1 obtains $$\hat{u}^{(1)}_{[1:K_1]}$$

through decoding by using the soft value $$v^{(1)}_{[1:N/m]}$$

corresponding to the first stream. Then, a polar codeword $x^1$ corresponding to $$\hat{u}^{(1)}_{[1:K_1]}$$

is input into the demodulator. The demodulator obtains a soft value $$v^{(2)}_{[1:N/m]}$$

corresponding to the second stream, through demodulation by using y and $x^1$, and inputs the soft value into a polar code decoder 2. The polar code decoder 2 obtains $$\hat{u}^{(2)}_{[1:K_2]}$$

through decoding by using the soft value $$v^{(2)}_{[1:N/m]}.$$

By analogy, demodulation of an $m^{th}$ stream requires the sequence y that is received through the channel, and codewords $x^1$ to $x^{m-1}$ of the preceding (m−1) polar codes. Therefore, MLC utilizes m encoders and m decoders, which has high complexity in implementation.

6. Bit-Interleaved Coded Modulation (BICM)

FIG. 2b shows an example of a BICM procedure. For example, polar encoding (namely, polar code encoding) is performed on a to-be-transmitted information bit stream $u=\{u_1, u_2, \ldots, u_k\}$ (that is, including K information bits) to obtain a codeword $x=\{x_1, x_2, \ldots, x_N\}$ (that is, a codeword with a length of N is output). After the polar code codeword x is processed by an interleaver, a sequence $x'=\{x'_1, x'_2, \ldots, x'_N\}$ to be input into a modulator is obtained. Then, the modulator modulates x' into T=N/m transmit symbols $s=\{s_1, s_2, \ldots, s_T\}$ based on a modulation order m, in groups of m bits. A received sequence $y=\{y_1, y_2, \ldots, y_T\}$ is obtained after s is processed on the channel. Then, the demodulator demodulates, by using y, a soft value sequence $llr=\{llr_1, llr_2, \ldots, llr_N\}$ of a bit sequence corresponding to each symbol, where llr is deinterleaved to obtain a soft value sequence $llr'=\{llr'_1, llr'_2, \ldots, llr'_N\}$ to be input into a decoder (that is, polar decoding in FIG. 2b). Finally, the decoder obtains the information bit stream through decoding based on llr'.

It may be understood that the information bit stream shown in this application may also be referred to as a message bit stream, a bit sequence shown below, or the like. A name of an input signal for modulation and coding is not limited in this application.

7. Offline Construction Procedure of a Polar Code

As shown in FIG. 2c, a message bit stream $u=\{u_1, u_2, \ldots, u_k\}$ may be extended to a message carrier sequence $$b_1^N = \{b_1, b_2, \ldots, b_N\}$$

with a length of N based on a given reliability sequence A. Then, the message carrier sequence $b_1^N$ is encoded based on an encoding matrix $G_2$ of the polar code, to obtain a codeword $$x_1^N = \{x_1, x_2, \ldots, x_N\}$$

of the polar code.

It may be understood that the coding and modulation method shown in FIG. 2a to FIG. 2c are merely an example. For parts that are not described in detail in the method, refer to a related standard, a technical protocol, or the like.

Although the information bit stream is split in the MLC method, each stream corresponds to one polar code encoder. Therefore, one polar code encoder has only one channel type. In other words, each polar code encoder constructs a polar code for only one channel type. For the BICM method, because the interleaver simultaneously processes m types of bit channels generated by higher-order modulation, the polar code encoder may consider that these bit channels processed by the interleaver comply with a distribution. Therefore, the polar code encoder still constructs a polar code based on one channel type. In the coding and modulation method shown in FIG. 2c, because polar code encoding is performed by using a reliability sequence with a length of N, a feature of m types of bit channels is not reflected.

In other words, an encoding and modulation method, and a demodulation and decoding method shown in FIG. 2a to FIG. 2c may be understood as a coding and modulation method performed for a same type of bit channels, and performance of the foregoing coding and modulation method in higher-order modulation is not ideal.

In view of this, this application provides an encoding and modulation method, a demodulation and decoding method, and an apparatus, to improve a code length gain of coding and modulation, and improve performance of coding and modulation.

Figure 6A:
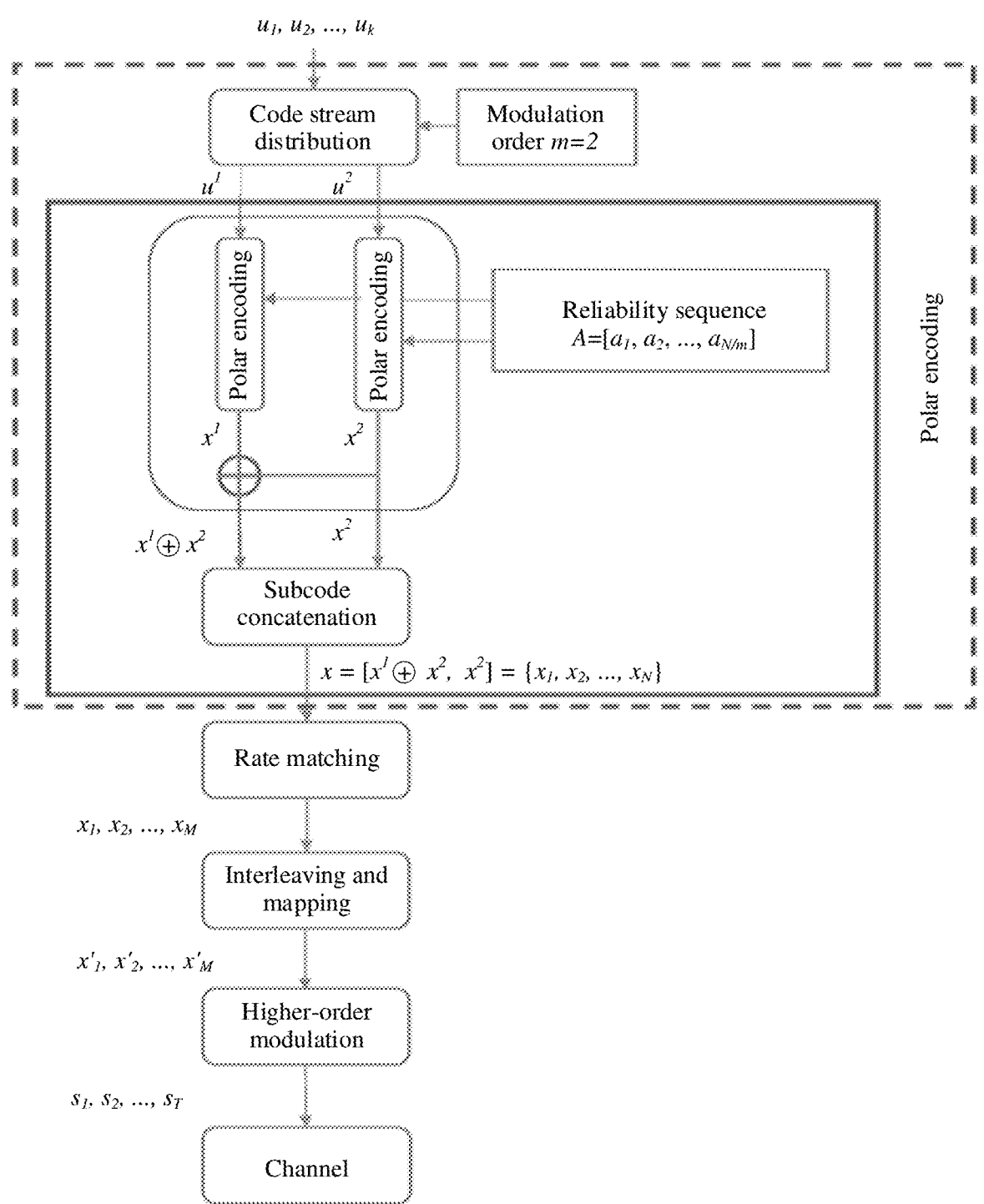
FIG. 6a is a schematic flowchart of encoding and modulation, and demodulation and decoding according to an embodiment of this application.
Figure 6B:
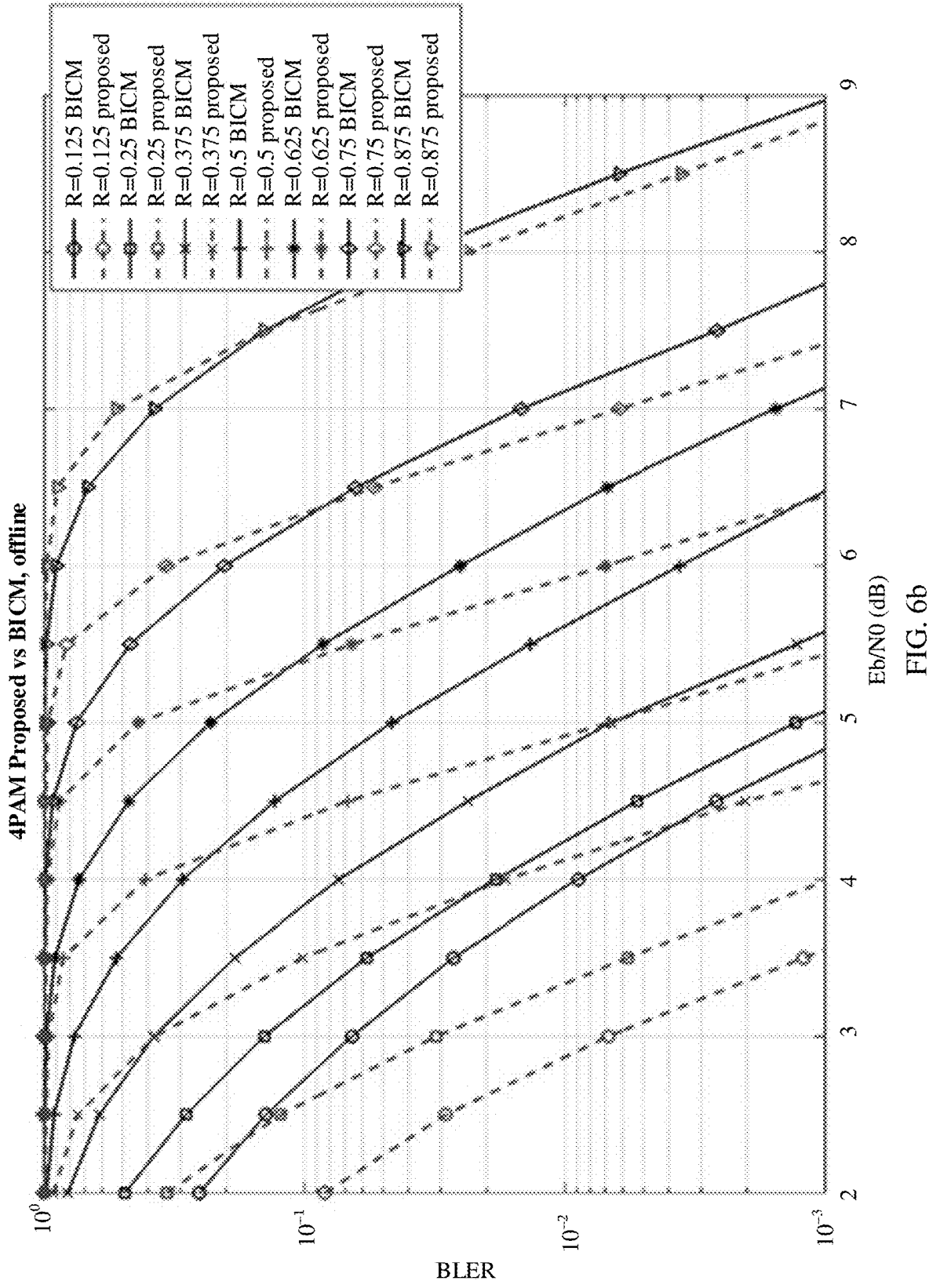
FIG. 6b and FIG. 6c are schematic diagrams of simulation results according to an embodiment of this application.
Figure 6C:
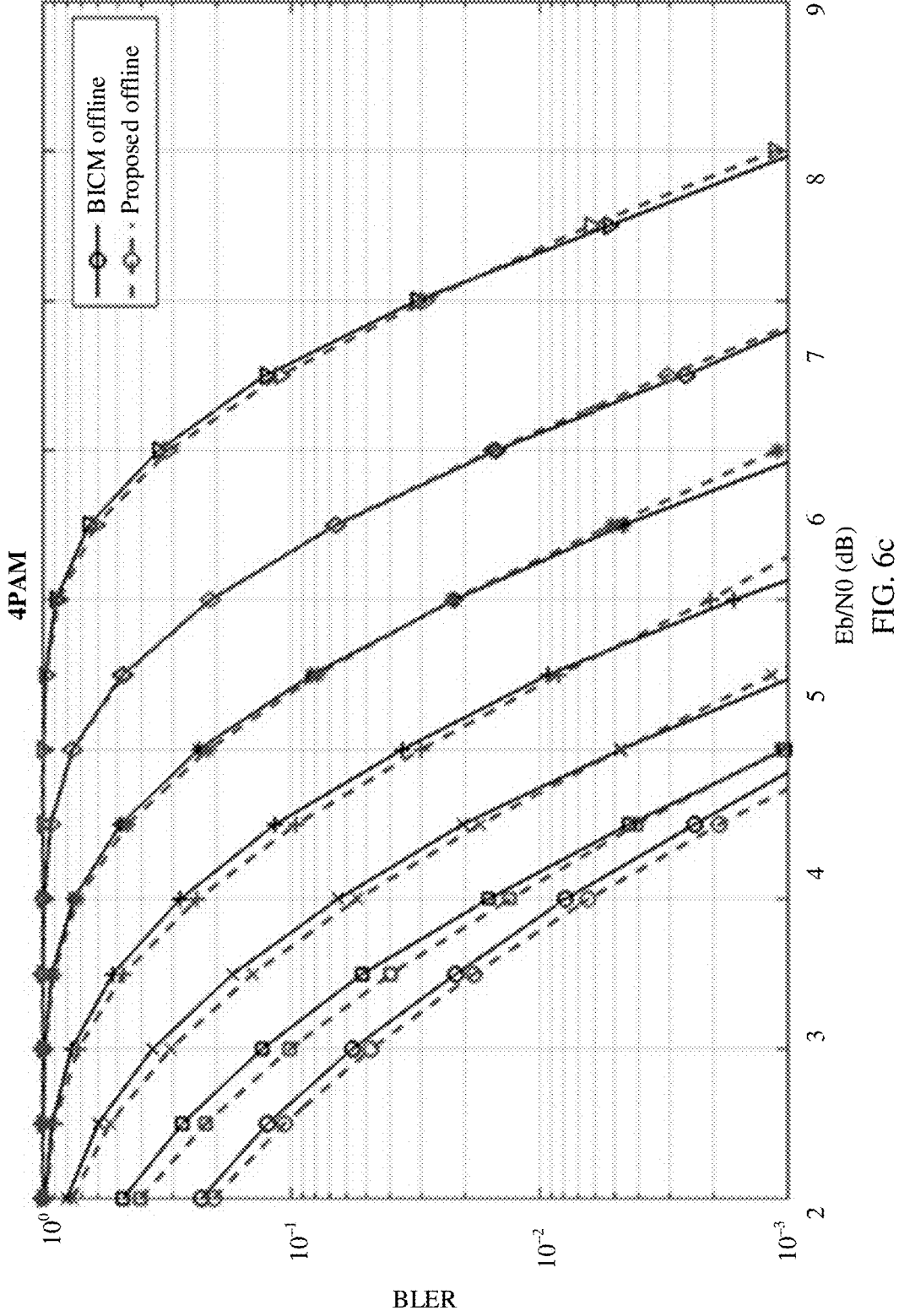

Optionally, the method provided in this application can further combine the following feature: When a modulation order is m, a higher-order modulated channel including $2^m$ or $2^{2m}$ symbols has m different types of bit channels. Coding and modulation are then performed to improve a polarization effect on the bit channels. The polarization effect may be understood as follows: given the same conditions, compared with the method shown in FIG. 2a, the method provided in this application may use a higher code rate; achieve a lower bit error rate; or achieve a higher channel capacity. For performance effects of the method provided in this application, further refer to FIG. 6b and FIG. 6c shown below.

Figures 4, 5A:
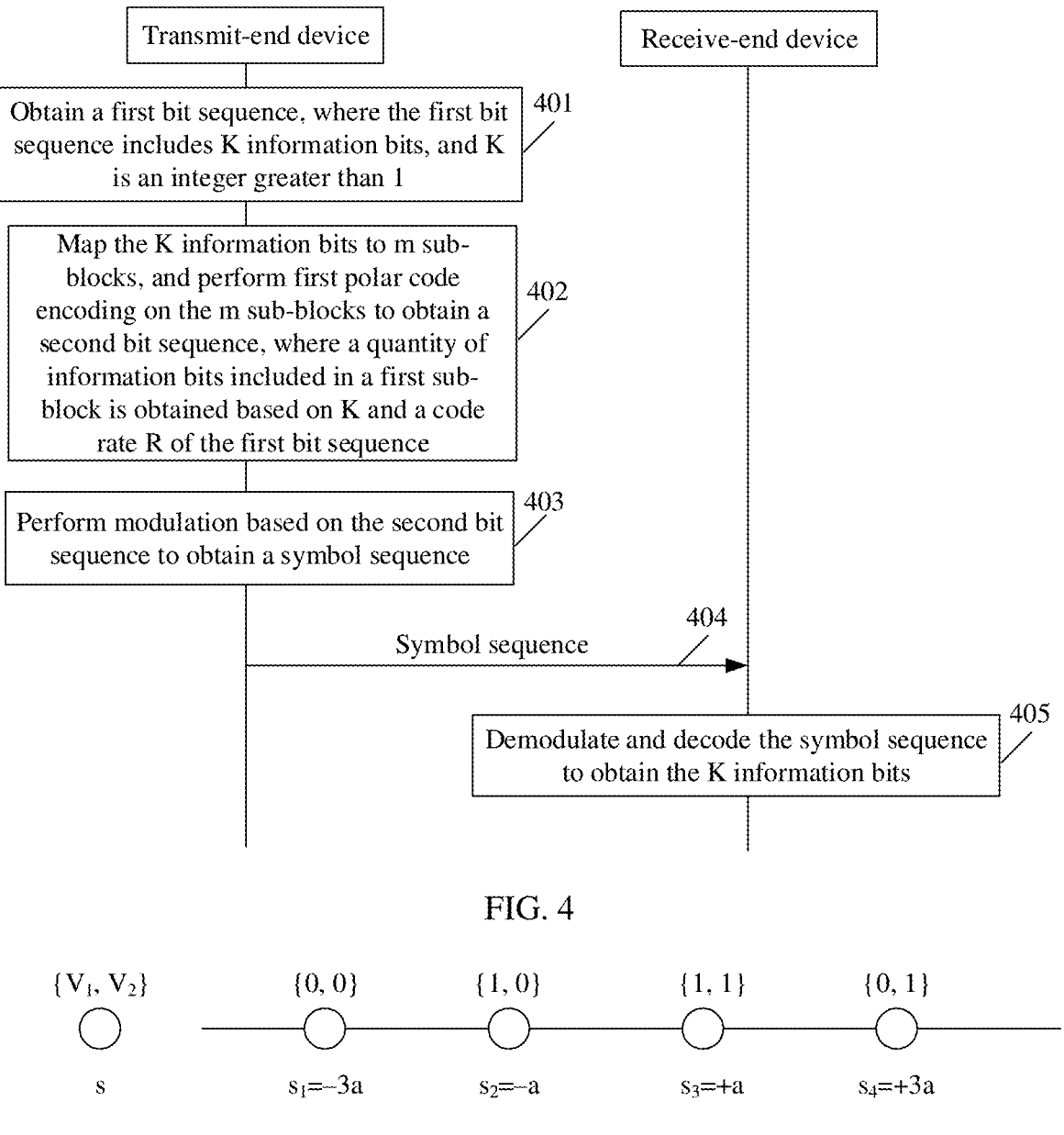
FIG. 4 is a flowchart of a method for encoding and modulation, and demodulation and decoding according to an embodiment of this application.
FIG. 5a and FIG. 5b are schematic diagrams of results of a modulated symbol according to an embodiment of this application.

It may be understood that the method provided in this application may be applied to a scenario in which polar code encoding is performed on different types of bit channels, for example, a higher-order modulation and coding method shown in FIG. 4. The method provided in this application may be further applied to polar code coding in a multiple input multiple output (MIMO) system having m antennas. Because channels on the m antennas are different from each other, and are different types of bit channels, this application may also be applied to these different bit channels to complete offline construction and coding of a polar code. For a specific process, refer to FIG. 4 shown in the following, except that each information bit sub-sequence (or each sub-block or each stream) is no longer corresponding to a bit channel in higher order modulation, but is corresponding to the m antennas in the MIMO system. For example, m sub-blocks shown below may correspond to the m antennas.

FIG. 4 is a schematic flowchart of a method for encoding and modulation, and demodulation and decoding according to an embodiment of this application. The method may be applied to a communication apparatus.

Optionally, the communication apparatus may include a transmit-end device, that is, the method may be applied to the transmit-end device. The transmit-end device may be understood as a device that sends an information bit. Alternatively, the transmit-end device may be understood as a device that sends a symbol sequence. Alternatively, the transmit-end device may be understood as a device that encodes and modulates an information bit. Specific descriptions of the transmit-end device are not limited in this embodiment of this application. Optionally, the communication apparatus may include a receive-end device, that is, the method may be applied to the receive-end device. The receive-end device may be understood as a device that receives a symbol sequence. Alternatively, the receive-end device may be understood as a device that demodulates and decodes a symbol sequence. Specific descriptions of the receive-end device are not limited in this embodiment of this application. Optionally, the method may alternatively be applied to at least two communication apparatuses. For example, the method may be applied to a transmit-end device and a receive-end device.

For example, the transmit-end device may be a terminal device (including a chip or the like), and the receive-end device may be a network device (including a chip or the like). For another example, the transmit-end device may be a network device (including a chip or the like), and the receive-end device may be a terminal device (including a chip or the like). For another example, both the transmit-end device and the receive-end device may be terminal devices or the like. Specific product forms of the transmit-end device and the receive-end device are not limited in this embodiment of this application.

As shown in FIG. 4, the method for encoding and modulation, and demodulation and decoding includes the following steps:

401: The transmit-end device obtains a first bit sequence, where the first bit sequence includes K information bits, and K is an integer greater than 1.

The first bit sequence may be understood as a to-be-transmit bit sequence obtained by the transmit-end device. The first bit sequence may be understood as a bit sequence that contains information or is to be transmitted or the like. For example, the K information bits may include cyclic redundancy check (CRC) bits, and may further include parity check (PC) bits. For another example, K may be greater than or equal to 18 (for example, for uplink transmission). In this case, the CRC may include 6 bits, 11 bits, or the like. For another example, K may be greater than or equal to 36 (for example, for downlink transmission). In this case, the CRC may include 24 bits, or the like. It may be understood that a value of K shown herein is merely an example. For a specific value of K, refer to a related standard or protocol, or the like. This is not limited in this embodiment of this application. In this embodiment of this application, the first bit sequence may include the K information bits.

For example, that transmit-end device obtains the first bit sequence may include the following: The transmit-end device generates the first bit sequence, or a related apparatus that performs encoding and modulation in the transmit-end device obtains the first bit sequence from another apparatus in the transmit-end device. A manner of obtaining the first bit sequence by the transmit-end device is not limited in this embodiment of this application.

402: The transmit-end device maps the K information bits to m sub-blocks, and performs first polar code encoding on the m sub-blocks to obtain a second bit sequence. A quantity of information bits included in the first sub-block is obtained based on K and a code rate R of the first bit sequence. The first sub-block is a sub-block in the m sub-blocks, where m is a modulation order of the first bit sequence. A length of the second bit sequence is N, where N is an integer greater than 1.

Sub-block: The m sub-blocks may correspond to m reliability sequences, and one sub-block corresponds to one reliability sequence. For example, the m reliability sequences may be the same. In this case, the m sub-blocks correspond to one reliability sequence. For another example, at least two reliability sequences in the m reliability sequences may be different, and the two reliability sequences may be different in quantity.

The code rate R may meet the following formulas: For example, R may be a mother code rate, that is, R=K/N. For descriptions of K and N, refer to the foregoing descriptions. For example, R may alternatively be defined based on an actual transmission code length, and R=K/M. M may be understood as a transmission code length. For example, M may be related to a used channel resource and channel quality, may be obtained based on m, or the like.

Puncturing and shortening are manners belong to rate matching, and both achieve an objective of adjusting a code length by deleting some bits in original encoded bits. A difference between puncturing and shortening lies in that an encoded bit deleted in a puncturing operation is unknown at a receive end, that is, the receive end does not have prior information of a value of the deleted encoded bit, and a log-likelihood ratio (LLR) of the deleted encoded bit is set to 0 during decoding. In a shortening operation, a specific encoded bit is deleted, and a known value is sent on a sub-channel at a corresponding position of a transmit end, so that the receive end can know a value of the encoded bit in advance, and set an LLR of the deleted encoded bit to positive/negative infinity based on a position of the encoded bit during decoding. It may be understood that for specific descriptions of puncturing or shortening, a relationship between the code rate R and K, and the like, refer to a related standard or protocol. This is not limited in this embodiment of this application.

In this embodiment of this application, a total quantity of information bits included in the m sub-blocks is equal to K, and there is no intersection between information bits included in each sub-block. For example, $u^j$ represents a quantity of information bits included in a $j^{th}$ sub-block, where j is an integer greater than or equal to 1 and less than or equal to m, and u represents K information bits included in the first bit sequence. In this case, a quantity of information bits included in the sub-block may meet the following formula:

$$u^1 \cap u^2 \cap \ldots \cap n^m = \varnothing \qquad (1)$$

$$u^1 \cup u^2 \cup \ldots \cup u^m = u \qquad (2)$$

A quantity of information bits included in each sub-block may be obtained based on K and R. Further, the quantity of information bits included in the first sub-block is not only obtained based on K and R, but also is less than or equal to a quantity of non-punctured or non-shortened information bits included in the first sub-block.

For descriptions of the quantity of information bits included in each sub-block, refer to formula (6), formula (7), formula (8), and the like shown below. Details are not described herein. It may be understood that whether quantities of information bits included in all sub-blocks are the same is not limited in this embodiment of this application. For example, the quantity of information bits included in the first sub-block may be different from a quantity of information bits included in the second sub-block, and the second sub-block is one sub-block in the m sub-blocks. For example, the quantity of information bits included in the first sub-block may be the same as the quantity of information bits included in the second sub-block.

The foregoing describes the quantity of information bits included in each sub-block, and the following describes positions of information bits in each sub-block. It may be understood that the following uses the first sub-block as an example to describe positions and lengths of information bits in each sub-block. However, this should not be construed as a limitation on this embodiment of this application.

In a possible implementation, positions of the information bits in the first sub-block are determined based on a reliability sequence with the same length as the first sub-block.

In this embodiment of this application, the reliability sequence with the same length as the first sub-block may be equal to a reliability sequence with the same length as the second sub-block. For example, lengths of all sub-blocks in the m sub-blocks may be the same. If a reliability sequence with the same length as the sub-block is referred to as a reliability sequence corresponding to the sub-block, the reliability sequences corresponding to all the sub-blocks in the m sub-blocks may be the same. For example, reliability sequences corresponding to at least two sub-blocks in the m sub-blocks may be different. For example, when lengths of the reliability sequences are the same, for example, a uniform length is given for the reliability sequences, reliability of different positions may be changed by adjusting a polarization weight (PW) exponent, so as to obtain different reliability sequences. Alternatively, lengths of the reliability sequences are different, that is, lengths of different sub-blocks are different. A manner of obtaining different reliability sequences is not limited in this embodiment of this application. It may be understood that for descriptions of the reliability sequence, refer to the foregoing descriptions. Details are not described herein again.

For example, the positions of the information bits in the first sub-block may alternatively be determined based on non-punctured or non-shortened positions.

For example, because the bit sequence with the length of N is obtained by mapping the K information bits to the m sub-blocks and performing first polar code encoding, the length of the first sub-block may be determined based on N and m. For example, the length of the first sub-block may be N/m. For general m-order modulation (for example, m is a multiple of 2), for example, $2^2$-PAM or $2^4$-QAM when m=2, or $2^4$-PAM or $2^8$-QAM when m=4, because N is a positive integer power of 2 (for example, a binary kernel $G_2$ used by a polar code encoding matrix in a related standard), N may be exactly divided by m. However, if the modulation order m is not a multiple of 2, for example, $2^3$-PAM or $2^6$-QAM when m=3, because N/m is not an integer, processing may be performed by using a non-binary polarization kernel N (which may also be understood as processing on the foregoing $G_2$). For example, a ternary polarization kernel is used so that N is a power of m=3. Therefore, N/m is an integer. It may be understood that for descriptions of a relationship between N and m, refer to a related standard or protocol, or the like. This is not limited in this embodiment of this application.

The foregoing step 402 is described below.

A method for mapping the K information bits to the m sub-blocks may be shown as follows: For example, the transmit-end device may directly map the corresponding information bits to the m sub-blocks, for performing first polar code encoding on the m sub-blocks. For example, the transmit-end device may first divide the K information bits, for example, the K information bits are divided into m information bit sub-sequences. A quantity of information bits included in each of the m information bit sub-sequences may be determined based on K and R. Then, the m bit sub-sequences are respectively mapped to the m sub-blocks. For example, the transmit-end device may divide u into m information bit sub-sequences, for example, $u^1$, $u^2$, ..., $u^m$. It may be understood that $u^j$ shown herein may still meet the foregoing formula (1) and formula (2). It may be understood that the information bit sub-sequence shown herein is corresponding to the K information bits, and information bits included in each information bit sub-sequence is a part of the K information bits.

The performing first polar code encoding on the m sub-blocks to obtain a second bit sequence includes: performing second polar code encoding on each of the m sub-blocks to obtain m sub-polar codes; and obtaining the second bit sequence based on the m sub-polar codes.

In a possible implementation, a relationship between the first polar code encoding and the second polar code encoding is as follows: Performing second polar code encoding on each of the m sub-blocks does not mean separately performing polar code encoding on the m sub-blocks by m polar code encoders. However, the second polar code encoding is split from the first polar code encoding using a nesting property of the polar code. In other words, although the K information bits may be mapped to the m sub-blocks, the second polar code encoding is still performed on each of the m sub-blocks by using one polar code encoder. The transition from the first polar encoding to the second polar encoding is completed using the nesting property of the polar code, which does not increase encoding complexity, and further better implements the process of mapping the K information bits to the m sub-blocks, and allocating positions to the information bit sub-sequences by using a shorter reliability sequence, that is, the process of mapping the information bit sub-sequences to the sub-blocks. Alternatively, compared with FIG. 2a, in the method provided in this embodiment of this application, a length output by the polar code encoder is longer. For example, a length output by the polar code encoder is N/m in FIG. 2a, while the length output by the polar code encoder is N in the method provided in this embodiment of this application. Therefore, a code length gain is effectively improved, and a code length gain can be fully utilized.

In other words, the performing second polar code encoding on each of the m sub-blocks may be understood as a polar code encoding process, and this implementation does not increase complexity of polar code encoding. For example, two polar code encoders shown in FIG. 6a are not polar code encoders in a real sense. Instead, one encoding process is split and described using the nesting property of the polar code. In other words, FIG. 6a shows only one polar code encoder.

In the foregoing case, when the receive-end device demodulates and decodes the symbol sequence, the receive-end device may decode the symbol sequence based on the symbol sequence by using one polar code decoder.

In another possible implementation, the second polar code encoding may be further understood as a second polar code encoder, and the first polar code encoder may be understood as a process of performing polar code encoding again on the m sub-polar codes output by m second polar code encoders, and obtaining a bit sequence with the length of N. In this case, when the receive-end device demodulates and decodes the symbol sequence, the receive-end device may decode the symbol sequence based on the symbol sequence by using m polar code decoders.

A method for obtaining the second bit sequence based on the m sub-polar codes is as follows: For example, the m sub-polar codes may be integrated based on a polar code generation matrix, to obtain the second bit sequence with the length of N (which may also be referred to as a polar code with the length of N).

For example, when m=2, two sub-polar codes are respectively $x^1$ and $x^2$, and the polar code with the length of N meets the following formula:

$$x=[x^1,x^2]\times G_2^{\otimes 1} \qquad (3), \text{ where}$$

$G_2$ represents a matrix with two rows and two columns, elements in the first row are [1, 0], elements in the second row are [1, 1], and $\otimes$ represents a Kronecker product operation.

For another example, when m=4, four sub-polar codes are respectively $x^1$, $x^2$, $x^3$, and $x^4$, and the polar code with the length of N meets the following formula:

$$x=[x^1,x^2,x^3,x^4]\times G_2^{\otimes 2} \qquad (4)$$

More generally, the polar code with the length of N may meet the following formula:

$$x=[x^1,x^2,\ldots,x^m]\lambda G_2^{\otimes \ log \ 2(m)} \qquad (5)$$

It may be understood that the foregoing integration method for obtaining the polar code with the length of N based on the m sub-polar codes is merely an example. In specific implementation, there may be another method for obtaining the polar code with the length of N based on the m sub-polar codes. This is not limited in this embodiment of this application.

403: The transmit-end device performs modulation based on the second bit sequence to obtain a symbol sequence.

For example, the transmit-end device may perform rate matching on the second bit sequence to obtain a codeword with a length of M, and modulate the codeword with the length of M to obtain a symbol sequence. M represents a codeword length after rate matching, and may be determined by a channel resource or the like.

The modulated symbol sequence may include S symbols, and a relationship between S and m may meet the following two relationships:

In a first relationship, when pulse amplitude modulation (PAM) is used, $S=2^m$, that is, a quantity of modulated symbol types included in one S-PAM modulation is S. In step 403 shown below, when the transmit-end device performs modulation based on the second bit sequence, the transmit-end device may use a PAM modulation scheme. For example, the transmit-end device may modulate m bits into one symbol (for example, may also be referred to as a modulated symbol) according to a specific labeling rule. In this case, each time one S-PAM symbol is sent, a maximum quantity of bits that can be transmitted is $\log_2(S)=m$ bits, that is, a maximum amount of information that can be transmitted on one S-PAM symbol is m bits. For example, when 2-PAM is used, the transmit-end device may modulate one bit (for example, a value of 0 or 1) into one symbol. For another example, when 4-PAM is used, the transmit-end device may modulate $\log_2(4)=2$ bits into one symbol. As shown in FIG. 5a, ($v_1=0$, $v_2=0$) is modulated as $s_1=-3a$, ($v_1=1$, $v_2=0$) is mapped as $s_2=-a$, ($v_1=1$, $v_2=1$) is mapped as $s_3=+a$, and ($v_1=0$, $v_2=1$) is mapped as $s_4=+3a$. In this case, a maximum of $\log_2(4)=2$ bits of information can be transmitted each time one symbol is sent. It may be understood that a may be understood as an amplitude of a signal. For example, a may be equal to $$\frac{1}{\sqrt{5}}.$$

Figure 5B:
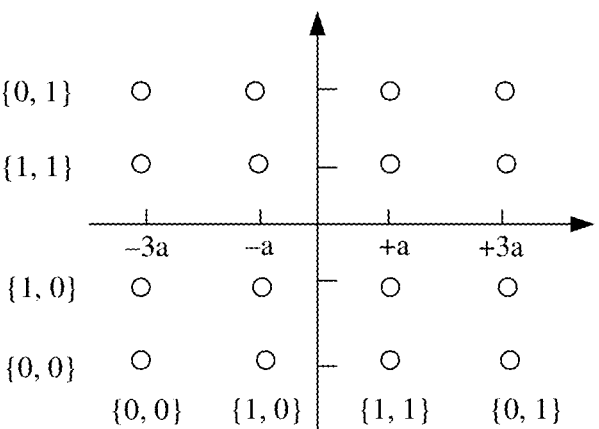

In a second relationship, when quadrature amplitude modulation (QAM) is used, $S=2^{2m}$. In this case, each time one S-QAM symbol is sent, a maximum quantity of bits that can be transmitted is $\log_2(S)=2m$ bits. As shown in FIG. 5b, a correspondence between a 4-PAM signal and 16-QAM may be shown in FIG. 5b. FIG. 5b is a result of extending a real-number PAM signal on a one-dimensional straight line to a complex-number QAM signal on a two-dimensional plane. It may be understood that for descriptions of FIG. 5a and FIG. 5b, reference may be referred to a related standard or a related protocol, or the like. This is not limited in this embodiment of this application.

It may be understood that the foregoing relationship between S and m is merely an example. With evolution of the modulation method and the like, the relationship between S and m may change. Therefore, the relationship between S and m is not limited in this embodiment of this application.

With reference to the QAM and PAM modulation method shown above, the symbol sequence may include T modulated symbols, and T is obtained based on M and m. For example, when m=2, m=4, or m=8 (that is, m is a positive integer power of 2), M may be exactly divided by m. In this case, T=M/m. For example, when m=3, m=5, or the like, because M cannot be exactly divided by m, in this case, 0 or 1 may be added to a bit sequence corresponding to the modulated symbol, or the like. It may be understood that for a specific case in which M cannot be exactly divided by m, refer to a related standard or protocol, or the like. This is not limited in this embodiment of this application.

For example, the transmit-end device may alternatively not perform rate matching on the second bit sequence, or the like. This is not limited in this embodiment of this application.

For example, the transmit-end device may perform interleaving, mapping, and modulation on the second bit sequence, to obtain a symbol sequence.

Figure 3A:
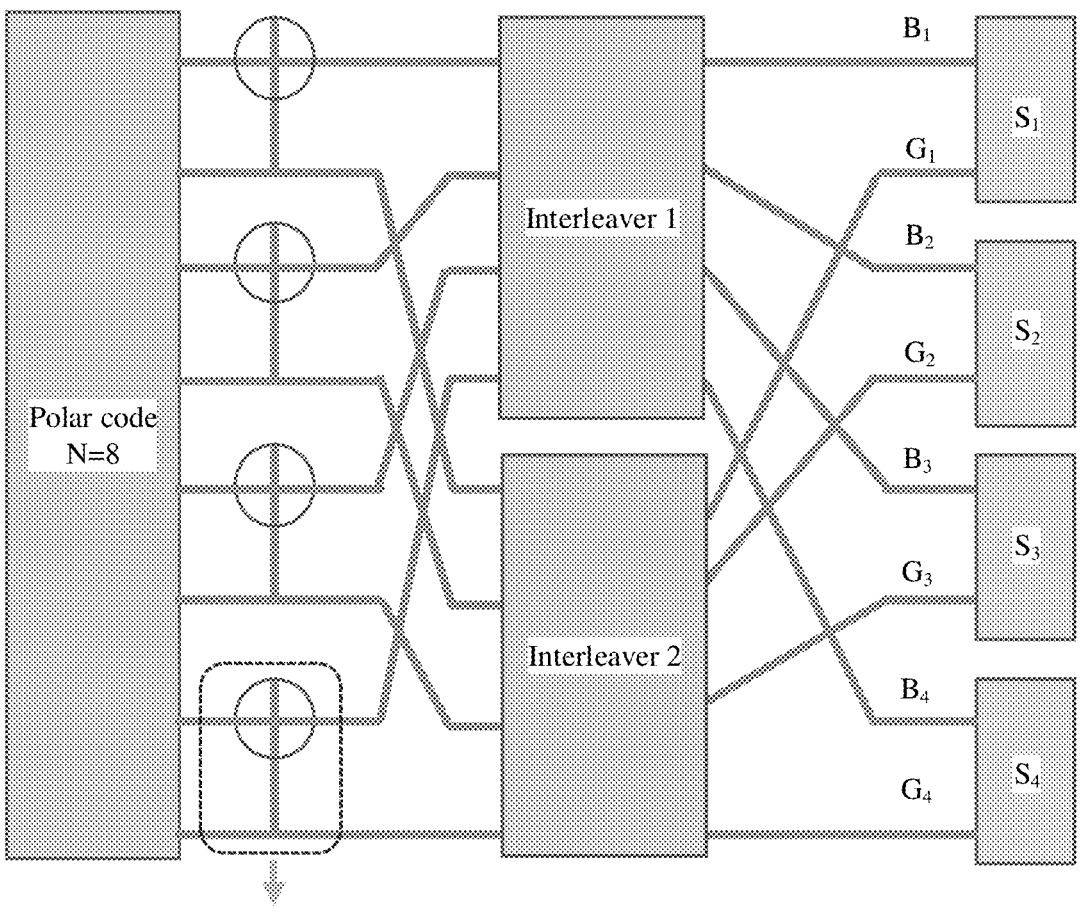
FIG. 3a and FIG. 3b are schematic diagrams of comparison between interleavers in encoding and modulation according to an embodiment of this application.
Figure 3B:
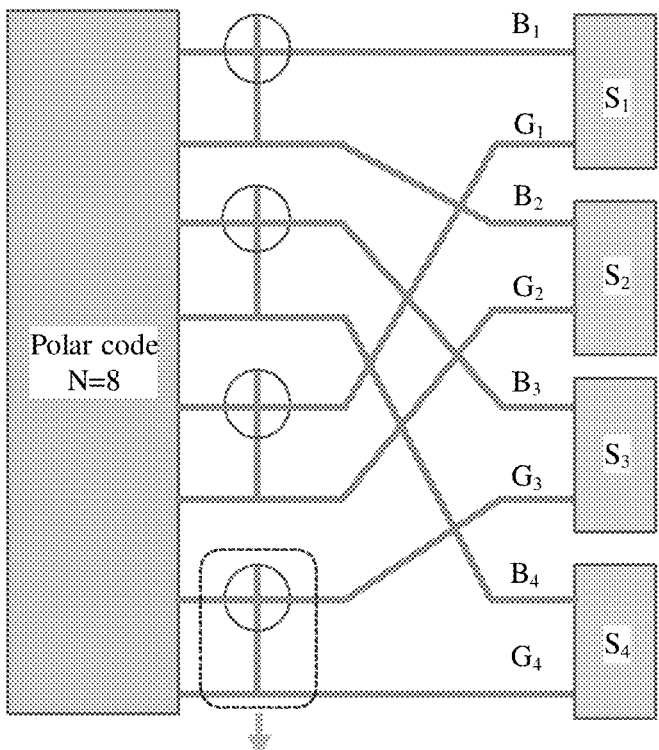

Description of interleaving: For example, as shown in FIG. 3*a*, if different types of bit channels are combined in pairs at each polarization unit, a polarization effect of the channel can be enhanced. The interleaver ensures that the bit channels at each polarization unit come from different symbols so that the channels used by each polarization unit are independent of each other. For example, in FIG. 3*a*, each 4-PAM high-order modulated symbol $S_t$(t=1, 2, 3, 4) is demodulated to produce bit channels $G_t$ and $B_t$ of types of good ($G_t$) and bad ($B_t$) respectively. Two different types of bit channels from different symbols are polarized at one polarization unit (dashed box). This manner can produce a better polarization effect compared to polarization of same type of bit channels from different symbols at one polarization unit (as shown in FIG. 3*b*). Therefore, in this embodiment of this application, a better polarization effect can be realized by performing interleaving and mapping on the second bit sequence.

For example, as shown in FIG. 6*a*, the transmit-end device may further perform rate matching, interleaving, mapping, and modulation on the second bit sequence, to obtain a symbol sequence.

A manner in which the transmit-end device performs modulation based on the second bit sequence is not limited in this embodiment of this application.

404: The transmit-end device outputs the symbol sequence.

For example, that the transmit-end device outputs the symbol sequence may include the following: The transmit-end device sends the symbol sequence to the receive-end device. Alternatively, the transmit-end device outputs the symbol sequence to a channel, and transmits the symbol sequence through the channel. Alternatively, a related apparatus that performs encoding and modulation in the transmit-end device outputs the symbol sequence to another apparatus in the transmit-end device, so that the another apparatus processes the symbol sequence. A specific manner in which the transmit-end device outputs the symbol sequence is not limited in this embodiment of this application. It may be understood that for specific descriptions of step 402 and step 403, refer to the following descriptions of FIG. 6*a* or the like.

After the transmit-end device outputs the symbol sequence, the receive-end device correspondingly obtains the symbol sequence.

It may be understood that, for specific descriptions of the symbol sequence, refer to the descriptions of step 401 to step 403. Details are not described herein again. For example, the symbol sequence received by the receive-end device is obtained through modulation based on the second bit sequence. The second bit sequence is a bit sequence obtained by mapping the K information bits included in the first bit sequence to the m sub-blocks and performing first polar code encoding on the m sub-blocks. For example, the quantity of information bits included in the first sub-block is obtained based on K and the code rate R of the first bit sequence. For descriptions of each parameter or letter, refer to the foregoing descriptions. Details are not described herein again.

405: The receive-end device demodulates and decodes the symbol sequence to obtain the K information bits.

In this embodiment of this application, the receive-end device may demodulate the symbol sequence through parallel demodulation, or may demodulate the symbol sequence through serial demodulation. For example, the receive-end device may further perform demodulation, decoding, de-interleaving, and the like on the symbol sequence, to obtain the K information bits.

According to the method provided in this embodiment of this application, the K information bits are mapped to the m sub-blocks, to perform first polar code encoding on the m sub-blocks, so as to obtain the second bit sequence. Therefore, when quantities of information bits to be encoded and modulated are the same, and quantities of symbols (which may also be referred to as quantities of modulated symbols) output by a modulator are the same, a code length gain is effectively improved, and coding and modulation performance is improved according to the method provided in this embodiment of this application.

In addition, a quantity of information bits included in each sub-block is reallocated by mapping the K information bits to the m sub-blocks. For example, the quantity of information bits in the first sub-block may be obtained based on K and R. Therefore, in one aspect, each sub-block may correspond to one type of bit channel, that is, the m sub-blocks may correspond to at least two different types of bit channels, for example, the m sub-blocks correspond to m different types of bit channels, so that encoding and modulation are performed on at least two different types of bit channels (including m different types of bit channels). This improves coding and modulation performance and a polarization effect of the bit channel than the manner of performing encoding and modulation on only one type of bit channel (as shown in FIG. 2*a* to FIG. 2*c*). In another aspect, the quantity of information bits included in each sub-block is reallocated, so that a code rate of each sub-block can better meet a capacity of each sub-block generated by channel polarization on m different types of bit channels. In other words, the quantity of information bits included in each sub-block can better meet a channel capacity of each sub-block.

The following describes in detail a quantity of information bits included in a sub-block.

In this embodiment of this application, a quantity $u^j$ of information bits included in a $j^{th}$ sub-block meets the following formula:

$$u^j = \begin{cases} \lceil K \times R_j \rceil, \ j = m, m-1, \ldots, 2 \\ K - \sum_{i=2}^{i=m} u^i, \ j = 1 \end{cases} \qquad (6)$$

where $R_j$ represents a code rate allocation function of the $j^{th}$ sub-block, $R_j$ is determined based on the code rate R, where $R_1 + R_2 + \ldots + R_m = 1$, and $\lceil \ \rceil$ represents rounding up.

The foregoing formula (6) indicates that when j is an integer greater than or equal to 2 and less than or equal to m, $u^j = \lceil K \times R_j \rceil$. When j=1, $$u^1 = K - \sum_{i=2}^{i=m} u^i.$$

In other words, a total quantity of information bits included in m sub-blocks is equal to K. For example, a transmit-end device may divide K information bits into m information bit sub-sequences according to formula (6), and a quantity of information bits included in each information bit sub-sequence may be obtained according to formula (6).

When $K \times R_j$ is not an integer, the quantity of information bits included in the $j^{th}$ sub-block is determined in a rounding-up manner, so that the $j^{th}$ sub-block may be mapped to more information bits. In general, based on a characteristic of a reliability sequence, bits located at rear positions in a sequence are more reliable. Therefore, the $j^{th}$ sub-block with a larger value can be mapped to a greater quantity of information bits according to formula (6). This ensures that more information bits are probably transmitted to more reliable positions, and therefore reduces decoding errors.

It may be understood that the foregoing formula (6) is merely an example. For example, the quantity of information bits included in the $j^{th}$ sub-block meets the following formula:

$$u^j = \begin{cases} \lfloor K \times R_j \rfloor, \ j = 1, 2, \ldots, m-1 \\ K - \sum_{i=1}^{i=m-1} u^i, \ j = m \end{cases} \qquad (7)$$

It may be understood that, for specific descriptions of formula (7), refer to the foregoing formula (6) or the like. Details are not described herein again. For variant of formula (6), formula (7), or the like, details are not described in this embodiment of this application.

The foregoing rounding-down and rounding-down manners are merely examples. For example, a rounding method may be used. This is not limited in this embodiment of this application. Alternatively, allocation may be performed according to a principle that a difference between quantities of information bits of sub-blocks does not exceed one. Details are not described herein.

The following describes in detail $R_j$ provided in this embodiment of this application.

For example, the code rate allocation function $R_j$ of the $j^{th}$ sub-block meets the following formula:

$$R_j = p_n \times R^n + p_{n-1} \times R^{n-1} + \ldots + p_1 \times R^1 + p_0 \times R^0 \qquad (8), \text{where}$$

n is an integer, R n represents R raised to the power of n, and $p_n$ is a constant.

It may be understood that formula (8) merely shows an example of a code rate allocation function of one sub-block, and for a formula that is met by a code rate allocation function of another sub-block, refer to formula (8).

In the foregoing method for allocating quantities of information bits of the m sub-blocks, a relationship between a modulation order and different protection levels (for example, two protection levels in 16QAM) corresponding to a modulation order, and a feature of a polar code can be considered. This more effectively improves coding and modulation performance.

It should be noted that the foregoing method for allocating quantities of information bits of the m sub-blocks is also applicable to the coding and modulation method shown in FIG. 2a. $K_1$, $K_2$, . . . , and $K_m$ shown in FIG. 2a can be determined by using the method provided in this embodiment of this application with formula (6) and formula (8). In this case, coding and modulation performance can also be improved.

For example, the shown $p_1$ to $p_n$ above may vary with different cases. For example, depending on different cases, values of $p_1$ to $p_n$ may be different when values of n are the same. For another example, values of n may be different depending on different cases. For another example, depending on different cases, when values of n are different, values of $p_1$ to $p_t$ may be the same (or different), where t is an integer greater than 1 and less than n, or a value of t is less than smaller values of n in different cases.

The different cases may include the following:

Case 1: Values of $p_1$ to $p_n$ are different or values of n are different, depending on whether a second bit sequence is punctured and/or shortened.

Case 2: Values of $p_1$ to $p_n$ are different or values of n are different, depending on different values of m. For example, for different cases in which m=2 and m=3, values of $p_1$ to $p_n$ may be different when values of n are the same. Alternatively, for different cases in which m=2 and m=3, values of n are different. For another example, for different cases in which m=2 and m=4, values of $p_1$ to $p_n$ may be different when values of n are the same. For another example, for different cases in which m=2 and m=4, values of n are different. It may be understood that a value of m shown herein is merely an example, and m may alternatively be equal to 5, 6, or the like. This is not limited in this embodiment of this application.

Case 3: Values of $p_1$ to $p_n$ or values of n vary with different demodulation schemes used by a receive-end device. For example, based on a difference between parallel demodulation and serial demodulation, when values of n are the same, values of $p_1$ to $p_n$ may be different; or values of n are different. It may be understood that, for descriptions of the fact that different demodulation schemes result in different values of the foregoing coefficient or n, refer to the following descriptions of formula (10) to formula (13). Details are not described herein.

Case 4: Depending on different block error rates (BLER) achieved by successive cancellation (SC) decoding, values of $p_1$ to $p_n$ are different, or values of n are different. For example, when BLER=0.01 and BLER=0.001, or when BLER=0.001 and BLER=0.0001, values of n may be different, or values of $p_1$ to $p_n$ are different when values of n are the same.

It may be understood that, the foregoing different result in different BLERs, and when the BLERs are different, coefficients are different.

It may be understood that the foregoing cases are merely examples. The following describes a code rate allocation function by using an example in which m=2 and demodulation schemes are different, to further describe variations of the foregoing formula (8) depending on different cases.

When m=2, the code rate allocation function of the $j^{th}$ sub-block meets the following formula:

$$R_j = p_n \times R^n + p_{n-1} \times R^{n-1} + \ldots + p_1 \times R^1 + p_0 \times R^0 \qquad (9)$$

It may be understood that, values of coefficients such as $p_n$ in formula (9) may be different from values of the coefficients in formula (8), and/or values of n in formula (9) may be different from values of n in formula (8).

When m=2, the foregoing K information bits may be mapped to two sub-blocks. Therefore, formula (9) may be understood as a code rate allocation function $R_1$ of a $1^{st}$ sub-block or a code rate allocation function $R_2$ of $2^{nd}$ sub-block. Whether $R_1$ and $R_2$ correspond the same formula is not limited in this embodiment of this application. In another example, $R_2$ may alternatively be determined by formula (9), and $R_1 = 1 - R_2$.

The following describes, by using an example in which m=2 and $R_1 = 1 - R_2$, a formula that is met by the code rate allocation function provided in this embodiment of this application.

Implementation 1:

The code rate allocation function $R_2$ of the $2^{nd}$ sub-block meets the following formula:

$$R_2 = p_3 \times R^3 + p_2 \times R^2 + p_1 \times R^1 + p_0 \times R^0 \qquad (10), \text{where}$$

when the demodulation scheme is parallel demodulation, $p_3 = 0.6855$, $p_2 = -0.9543$, $p_1 = -0.2042$, and $p_0 = 1.011$.

For example, when R=0.875, according to formula (10), $R_2 = 0.5609$ can be obtained $R_2 = 0.5609$, and $R_1 = 1 - R_2 = 0.4391$. In addition, when m=2 and N=512, K=N×R (that is, when the second bit sequence is not punctured and/or shortened), and the following values can be obtained:

A quantity of information bits included in the $2^{nd}$ sub-block is $u^2 = \lceil K \times R_2 \rceil = \lceil N \times R \times R_2 \rceil = \lceil 512 \times 0.875 \times 0.5609 \rceil = 252$, and a quantity of information bits included in the $1^{st}$ sub-block is $u^1 = 196$.

A length of the $1^{st}$ sub-block may be N/m=512/2=256, and a length of a reliability sequence with the same length as the first sub-block may be 256. A length of the $2^{nd}$ sub-block may be 256, and a length of a reliability sequence with the same length as the $2^{nd}$ sub-block may be 256.

With reference to FIG. 6a, the transmit-end device divides a first bit sequence u={$u_1$, $u_2$, . . . , $u_K$} (that is, the K information bits) into two information bit sub-sequences: $u^1$ and $u^2$, and then performs second polar code encoding based on $u^1$ and $u^2$ to obtain $x^1$ and $x_2$ respectively. For example, $u^1$ and $u^2$ are separately mapped to a reliability sequence A={$a_1$, $a_2$, . . . , $a_{N/m}$} (which is also referred to as A=[$a_1$, $a_2$, . . . , $a_{N/m}$]). In other words, second polar code encoding is performed on two sub-blocks to obtain sub-polar codes with a length of 256, such as $x^1$ and $x^2$. Then, after performing a polar conversion on the two sub-polar codes, the two sub-polar codes are integrated into one polar code x with a length of N=512 (that is, subcode concatenation shown in FIG. 6a), for example, x=[$x^1 \otimes x^2$, $x^2$]={$x_1$, $x_2$, . . . , $x_N$}.

Then, rate matching is performed on x to obtain a codeword with a length of M, and interleaving and mapping are performed on x={$x_1$, $x_2$, . . . , $x_M$} to obtain x'={$x_1'$, $x_2'$, . . . , $x_M'$}. Finally, T=M/m symbols s={$s_1$, $s_2$, . . . , $S_T$} are obtained through higher-order modulation, and the T symbols are sent through a channel.

Compared with the modulation and coding method shown in FIG. 2a, although the K information bits are divided into m information bit sub-sequences in the method in FIG. 2a and the method in FIG. 6a, in the method shown in FIG. 6a, coding is performed by using one polar code encoder (only an example), and decoding also requires only one polar code decoder. In other words, encoding and decoding are simple to implement, and a decoding delay is low. However, in FIG. 2a, encoding is performed by using m polar code encoders, and m decoders are correspondingly required at a decode end. In addition, a subsequent decoder can start decoding only after a previous decoder finishes decoding, which has a high decoding delay. In other words, the modulation method shown in FIG. 2a requires a plurality of polar code encoders and decoders, which has high complexity and a high decoding delay. However, in the method shown in FIG. 6a, only one encoder and one decoder are required, which has low implementation complexity and a low decoding delay. In addition, in the method shown in FIG. 6a, the K information bits are divided into m information bit sub-sequences, and then second polar code encoding is performed on each of the m information bit sub-sequences by using a nesting property of a polar code, so that m different types of bit channels are polarized in one polar code encoder.

Therefore, compared with the method shown in FIG. 2a, the method shown in FIG. 6 has a better polarization effect.

It can be learned from FIG. 1B that, when bit channel capacities of serial demodulation and parallel demodulation are the same, BLERs corresponding to serial demodulation and parallel demodulation are different. Therefore, a coefficient used during serial demodulation may be different from a coefficient used during parallel demodulation. Therefore, when the demodulation scheme is serial demodulation, $p_3 = 0.8462$, $p_2 = -1.704$, $p_1 = 0.4165$, and $p_0 = 0.9453$.

Implementation 2:

The code rate allocation function $R_2$ of the $2^{nd}$ sub-block meets the following formula:

$$R_2 = p_4 \times R^4 + p_3 \times R^3 + p_2 \times R^2 + p_1 \times R^1 + p_0 \times R^0 \qquad (11), \text{where}$$

when the demodulation scheme is parallel demodulation, $p_4 = -0.8099$, $p_3 = 2.305$, $p_2 = -2.048$, $p_1 = 0.0796$, and $p_0 = 0.989$; and when the demodulation scheme is serial demodulation, $p_4 = 0.817$, $p_3 = -0.7891$, $p_2 = -0.5997$, $p_1 = 0.1299$, and $p_0 = 0.9679$.

Implementation 3:

The code rate allocation function $R_2$ of the $2^{nd}$ sub-block meets the following formula:

$$R_2 = p_2 \times R^2 + p_1 \times R^1 + p_0 \times R^0 \qquad (12), \text{where}$$

when the demodulation scheme is parallel demodulation, $p_2 = 0.07398$, $p_1 = -0.6434$, and $p_0 = 1.06$; and when the demodulation scheme is serial demodulation, $p_2 = -0.4346$, $p_1 = -0.1256$, and $p_0 = 1.005$.

Implementation 4:

The code rate allocation function $R_2$ of the $2^{nd}$ sub-block meets the following formula:

$$R_2 = p_1 \times R^1 + p_0 \times R^0 \qquad (13), \text{where}$$

when the demodulation scheme is parallel demodulation, $p_1 = -0.5697$, and $p_0 = 1.046$, and; when the demodulation scheme is serial demodulation, $p_1 = -0.5602$, and $p_0 = 1.086$.

Implementation 5:

When the demodulation scheme is parallel demodulation, the code rate allocation function $R_2$ of the $2^{nd}$ sub-block meets the following formula:

$$R_2 = \begin{cases} 0.5601, & 0.875 \le R \le 1.00 \\ 0.6136, & 0.750 \le R < 0.875 \\ 0.6775, & 0.625 \le R < 0.750 \\ 0.7536, & 0.500 \le R < 0.625 \\ 0.8380, & 0.375 \le R < 0.500 \\ 0.9127, & 0.250 \le R < 0.375 \\ 0.9715, & 0.125 \le R < 0.250 \\ 0.9800, & 0.000 \le R < 0.125 \end{cases} \qquad (14)$$

where when the demodulation scheme is serial demodulation, the code rate allocation function $R_2$ of the $2^{nd}$ sub-block meets the following formula:

$$R_2 = \begin{cases} 0.5744, & 0.875 \le R \le 1.00 \\ 0.6489, & 0.750 \le R < 0.875 \\ 0.7510, & 0.625 \le R < 0.750 \\ 0.8407, & 0.500 \le R < 0.625 \\ 0.8947, & 0.375 \le R < 0.500 \\ 0.9618, & 0.250 \le R < 0.375 \\ 0.9715, & 0.125 \le R < 0.250 \\ 0.9823, & 0.000 \le R < 0.125 \end{cases} \qquad (15)$$

It may be understood that the foregoing implementation 2 to implementation 5 are merely examples. For descriptions of the implementations, refer to the foregoing descriptions or the like. Details are not described herein again.

It may be understood that, when the code length N and the modulation order m are given, the code rate allocation function provided in this embodiment of this application may be a function related to the code rate R. For example, when an optimal code rate allocation function is represented by using polynomials (such as formula (8) to formula (13) above), when other conditions are the same, a higher modulation order corresponds to a higher optimal fitting power, or when other conditions are the same, a greater code length corresponds to a higher optimal fitting power.

For example, FIG. 6b and FIG. 6c are schematic diagrams of curves of BLER and signal-to-noise ratio (SNR) in serial demodulation and parallel demodulation provided by this embodiment of this application. In FIG. 6b and FIG. 6c, the abscissa represents SNR, the ordinate represents BLER, and the code rate R corresponding to the curve from left to right is R={1/8, 2/8, 3/8, 4/8, 5/8, 6/8, 7/8}. N=512, and m=2. FIG. 6b shows a comparison of BLER performance in serial demodulation of the proposed solution (namely, "proposed" shown in the figure) and the solution in FIG. 2b. FIG. 6c is a comparison of BLER performance in parallel demodulation of the proposed solution and the solution in FIG. 2b. It can be learned from FIG. 6b that at the given code rate R, the solution provided by this application achieves BLER=$10^{-2}$, and a required SNR is lower than an SNR required by the solution in FIG. 2b. It can be learned from FIG. 6c that at the given code rate R, an SNR required by the solution provided by this application to achieve BLER=$10^{-2}$ is lower than an SNR required by the solution in FIG. 2b, so that the solution provided by this application has better decoding performance. In addition, it can be learned that, at different code rates R, the solution provided in this application has improved performance than the solution in FIG. 2b.

It should be noted that, it is assumed that a selection criterion includes that a quantity of information bits included in any sub-block has to be less than or equal to a quantity of non-punctured or non-shortened information bits in the sub-block, and that positions of the information bits have to be located at non-punctured (pre-frozen positions are further included according to the 3GPP NR standard) or non-shortened positions. Further, it is also assumed that a quantity of information bits in a specific sub-block (which is defined as the first sub-block) calculated according to the foregoing method is greater than a quantity of non-punctured or non-shortened information bits in the first sub-block. In this case, the quantity of information bits in the first sub-block may be set equal to the quantity of non-punctured or non-shortened information bits in the first sub-block. Then, a quantity of information bits in each of the remaining sub-blocks is determined according to the foregoing method. If a quantity of information bits in the second sub-block is still greater than a quantity of non-punctured or non-shortened information bits in the second sub-block, the quantity of information bits in the second sub-block is set equal to the quantity of non-punctured or non-shortened information bits in the second sub-block. Then, a quantity of information bits in each of the remaining sub-blocks except the first sub-block and the second sub-block is determined according to the foregoing manner, and so on.

It may be understood that, according to the descriptions of the foregoing formula (8) in this application, n is an integer, $p_n$ is a constant, and the following content may be obtained:

n in the foregoing formula (8) may be an integer 0. In other words, the code rate allocation function $R_j$ in this application may be set a constant value $p_0$.

It may be understood that constant values corresponding to different j may be the same or different.

Figure 6D:
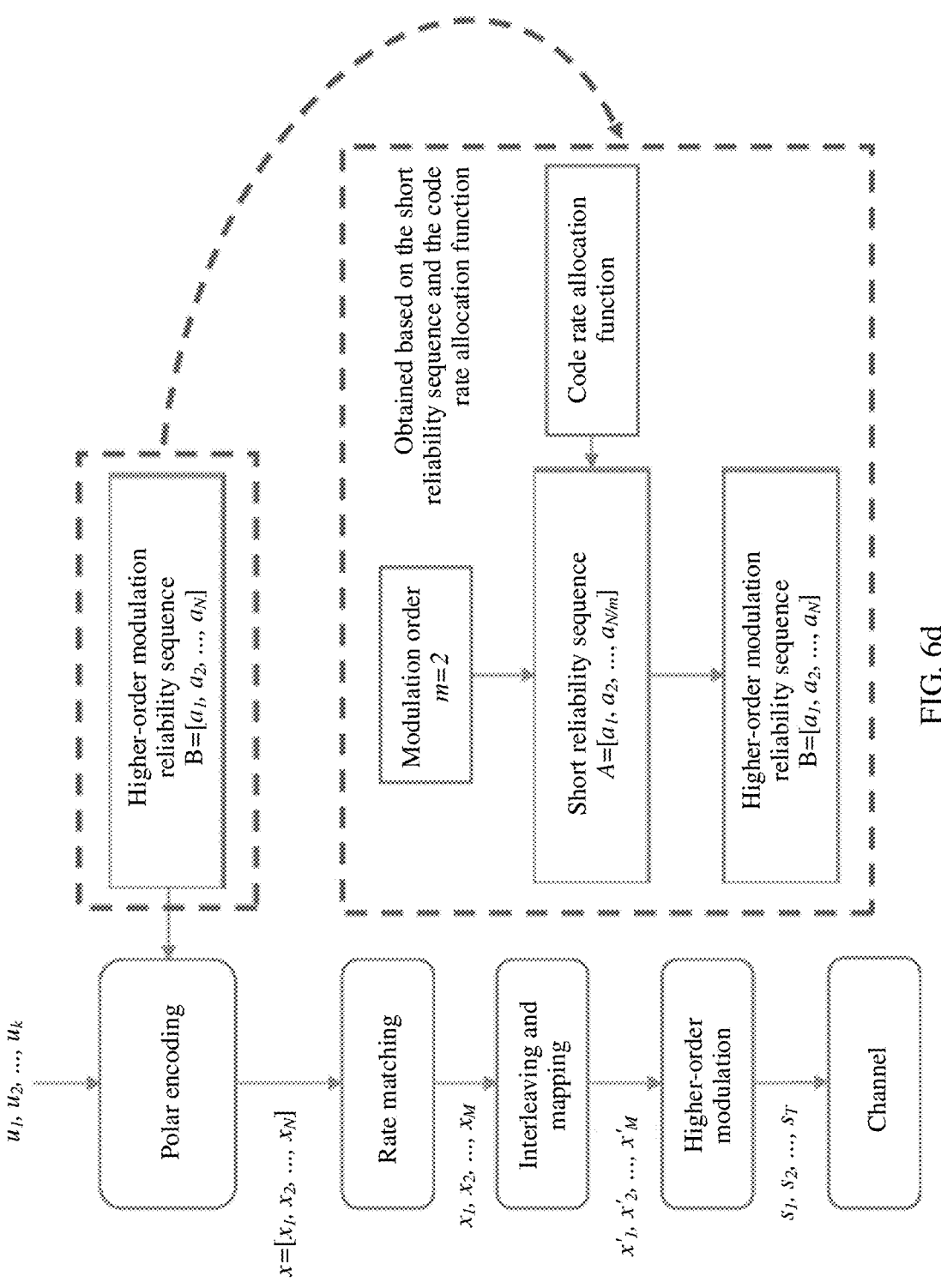
FIG. 6d is a schematic flowchart of encoding and modulation, and demodulation and decoding according to an embodiment of this application.

It should be noted that, in this application, a polar code in higher-order modulation may be directly constructed by using a long reliability sequence with the same length as the second bit sequence (that is, the process of second polar code encoding is not performed). As shown in FIG. 6d, a reliability sequence $a_1, a_2, \ldots, a_N$ with a length of N can be obtained based on a short reliability sequence $a_1, a_2, \ldots, a_{N/m}$ (namely, the reliability sequence shown above in this application). In other words, compared with FIG. 6a, FIG. 6d uses a long reliability sequence to construct a polar code of high-order modulation. The long reliability sequence $a_1, a_2, \ldots, a_N$ (for example, a high-order modulation reliability sequence B shown in FIG. 6d) can be obtained based on the short reliability sequence $a_1, a_2, \ldots, a_{N/m}$ (for example, the short reliability sequence A shown in FIG. 6d) shown above in this application. The two construction modes are actually equivalent. For example, assuming K=4, N=8, R=0.5, and m=2, a short reliability sequence with the same length as the first sub-block is $a_1, a_2, \ldots, a_{N/m}$=[1, 2, 3, 4]. Therefore, to obtain a reliability sequence with the length of 8 (namely, a reliability sequence with the same length as the second bit sequence), mapping from a sequence with the length of 4 to a sequence with the length of 8 is to be completed. For example, it is assumed that a quantity of information bits allocated to a $1^{st}$ first sub-block according to the code rate allocation function is 1, and a quantity of information bits allocated to a $2^{nd}$ first sub-block is 3. In this case, a position of the information bit in the $1^{st}$ first sub-block is [4], and a position of the information bit mapped to the sequence with the length of 8 may be [4]+(1−1)*4=[4]. Similarly, positions of the information bits in the $2^{nd}$ first sub-block are [2, 3, 4], and positions of the information bits mapped to the sequence with the length of 8 may be [2, 3, 4]+(2−1)*4=[6, 7, 8]. A final set of positions of information bits in the sequence with the length of 8 is [4, 6, 7, 8], and a reliability sequence with the length of 8 is [1, 2, 3, 5, 4, 6, 7, 8]. For example, for a given short reliability sequence $a_1, a_2, \ldots, a_{N/m}$ with the length of N/m, a set of positions of information bits in the reliability sequence with the length of N may be $[[a_{N/m-[K \times R_1]+1}, \ldots, a_{N/m}], [a_{N/m-[K \times R_2]+1}, \ldots, a_{N/m}], \ldots, [a_{N/m-[K \times R_m]+1}, \ldots, a_{N/m}]]$, where $R_j$ (j=1, 2, . . . , m) represents the code rate allocation function of the $j^{th}$ sub-block, $R_j$ is determined based on the code rate R, and $R_1+R_2+ \ldots +R_m$=1.

Optionally, for different code lengths and different modulation orders, values of the code rate allocation functions and/or values of code rate allocation functions may be the same or different. For example, for 16QAM: when the code length N<=1024, $R_1$=0.3, and $R_2$=0.7; when the code length N>1024, $R_1$=0.2, and $R_2$=0.8. Generally, code rate allocation functions of different protection levels corresponding to modulation orders change with N and/or the modulation order. For example, a larger value of N indicates more complete polarization, and a code rate allocation function with a low protection level may have a smaller value, or a code rate allocation function with a high protection level may have a larger value, or values of code rate allocation functions are presented in ascending order of protection level. Different N and modulation orders may correspond to different code rate allocation tables.

It may be understood that, $p_0$ shown in the foregoing formula (8) may vary with different cases. For example, depending on different cases, values of $p_0$ may be different when values of n are the same. For another example, depending on different cases, when values of n are different, values of $p_0$ may be the same or different.

The following describes communication apparatuses provided in embodiments of this application.

In this application, the communication apparatus is divided into functional modules based on the foregoing method embodiment. For example, functional modules corresponding to functions may be obtained through division, or two or more functions may be integrated into one processing module. The integrated module may be implemented in a form of hardware, or may be implemented in a form of a software functional module, and so on. It should be noted that, division into modules is an example in this application, and is merely logical function division. During actual implementation, another division manner may be used. The following describes in detail the communication apparatuses in embodiments of this application with reference to FIG. 7 to FIG. 9.

Figure 7:
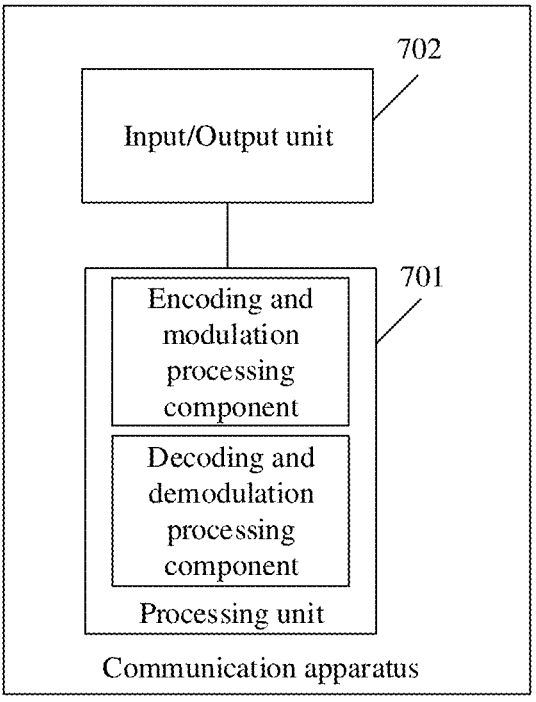
FIG. 7 to FIG. 9 are schematic diagrams of structures of a communication apparatus according to an embodiment of this application.

FIG. 7 is a schematic diagram of a structure of a communication apparatus according to an embodiment of this application. As shown in FIG. 7, the communication apparatus includes a processing unit 701 and an input/output unit 702.

In some embodiments of this application, the communication apparatus may be a transmit-end device, a chip in a transmit-end device, or the like shown above. In other words, the communication apparatus may be configured to perform a step, a function, or the like performed by the transmit-end device in the foregoing method embodiment.

The processing unit 701 is configured to obtain a first bit sequence.

The processing unit 701 is further configured to: map K information bits to m sub-blocks, and perform first polar code encoding on the m sub-blocks to obtain a second bit sequence.

The processing unit 701 is further configured to perform modulation based on the second bit sequence to obtain a symbol sequence.

The input/output unit 702 is configured to output the symbol sequence.

In this embodiment of this application, that the processing unit 701 is configured to obtain a first bit sequence may include the following: The processing unit 701 generates the first bit sequence; or the processing unit 701 obtains the first bit sequence through the input/output unit 702, or the like. The input/output unit 702 is configured to output the symbol sequence.

For example, the processing unit 701 is specifically configured to perform second polar code encoding on each of the m sub-blocks to obtain m sub-polar codes, and obtain the second bit sequence based on the m sub-polar codes.

It may be understood that specific descriptions of the input/output unit and the processing unit shown in this embodiment of this application are merely examples. For specific functions, steps, or the like performed by the input/output unit and the processing unit, refer to the foregoing method embodiment. Details are not described herein again. For example, the processing unit 701 may be further configured to perform step 401 to step 403 shown in FIG. 4. The input/output unit 702 may further be configured to perform a sending step in step 404 shown in FIG. 4.

FIG. 7 is reused. In some other embodiments of this application, the communication apparatus may be a receive-end device, a chip in a receive-end device, or the like shown above. In other words, the communication apparatus may be configured to perform a step, a function, or the like performed by the receive-end device in the foregoing method embodiment.

The input/output unit 702 is configured to obtain a symbol sequence.

The processing unit 701 is configured to demodulate and decode the symbol sequence to obtain K information bits.

It may be understood that specific descriptions of the input/output unit and the processing unit shown in this embodiment of this application are merely examples. For specific functions, steps, or the like performed by the input/output unit and the processing unit, refer to the foregoing method embodiment. Details are not described herein again. For example, the input/output unit 702 may be further configured to perform a receiving step in step 404 shown in FIG. 4, and the processing unit 701 may be further configured to perform step 405 shown in FIG. 4.

In the foregoing embodiments, for example, the processing unit 701 may include an encoding and modulation processing component and a decoding and demodulation processing component. The encoding and modulation processing component may be configured to perform operations such as encoding and modulation on the K input information bits. The demodulation and decoding processing component may be configured to perform demodulation and decoding on an input symbol sequence. It may be understood that the symbol sequence may not be a symbol sequence obtained by performing encoding and modulation on the K information bits. In other words, the processing unit may not perform demodulation and decoding on the symbol sequence processed by the processing unit. It may be understood that the encoding and modulation processing component and the decoding and demodulation processing component are merely examples. Specific product forms and shapes, or the like of the two components are not limited in this embodiment of this application.

It may be understood that in the foregoing embodiments, for descriptions of the first bit sequence, the second bit sequence, the K information bits, the m sub-blocks, the first polar code encoding, the second polar code encoding, and the like, refer to the descriptions in the foregoing method embodiment. Details are not described herein again.

The transmit-end device and the receive-end device in this embodiment of this application are described above. The following describes possible product forms of the transmit-end device and the receive-end device. It should be understood that a product in any form that has the function of the transmit-end device in FIG. 7 or a product in any form that has the function of the receive-end device in FIG. 7 fall within the protection scope of embodiments of this application. It should further be understood that the following descriptions are merely examples, and do not limit product forms of the transmit-end device and the receive-end device in embodiments of this application.

In a possible implementation, in the communication apparatus shown in FIG. 7, the processing unit 701 may be one or more processors, and the input/output unit 702 may be a transceiver. Alternatively, the input/output unit 702 may be a sending unit and a receiving unit, where the sending unit may be a transmitter, and the receiving unit may be a receiver. In this embodiment of this application, the processor and the transceiver may be coupled, or the like. A connection manner between the processor and the transceiver is not limited in this embodiment of this application.

Figure 8:
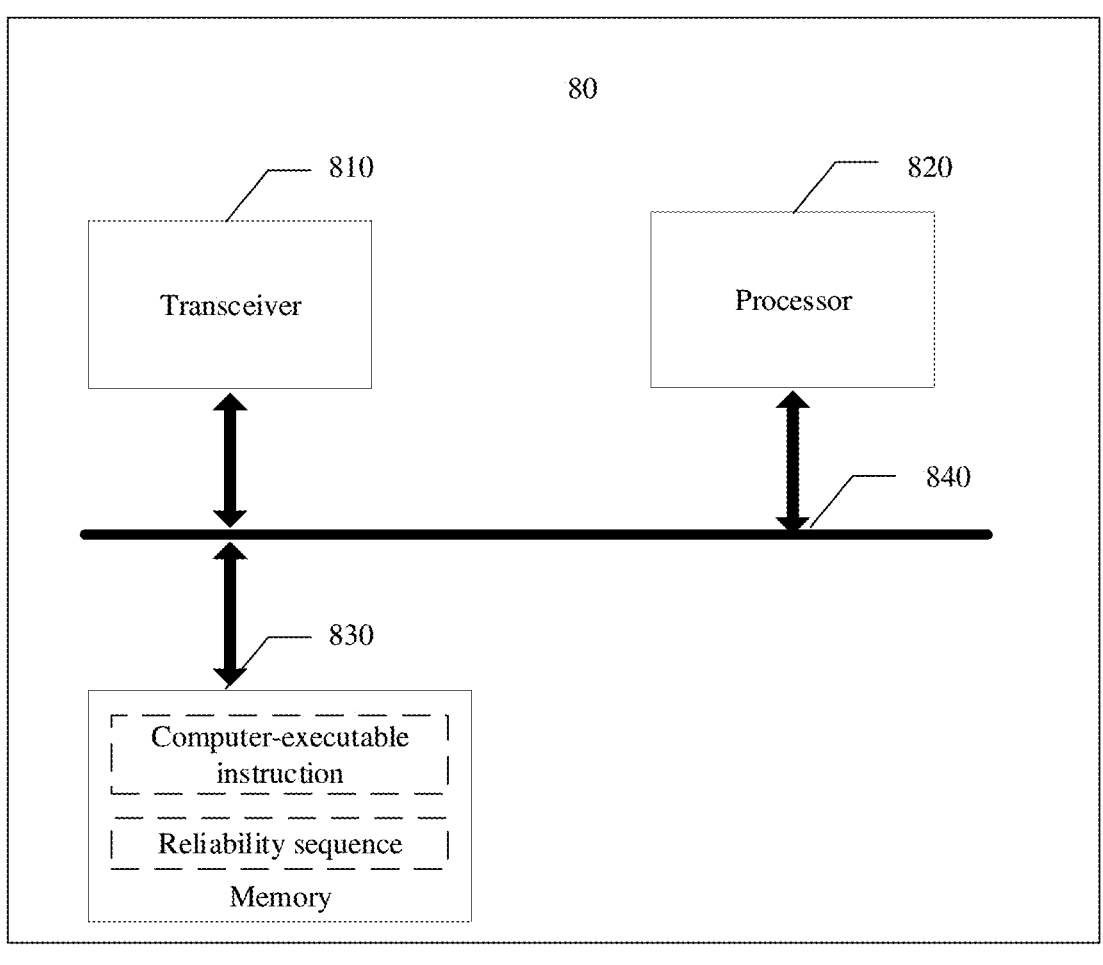

As shown in FIG. 8, a communication apparatus 80 includes one or more processors 820 and a transceiver 810.

For example, when the communication apparatus is configured to perform the step, method, or function performed by the foregoing transmit-end device, the processor 820 is configured to: obtain a first bit sequence, map K information bits to m sub-blocks, perform first polar code encoding on the m sub-blocks to obtain a second bit sequence, and perform modulation based on the second bit sequence to obtain a symbol sequence; and the transceiver 810 is configured to send the symbol sequence to the receive-end device.

For example, when the communication apparatus is configured to perform the step, method, or function performed by the foregoing receive-end device, the transceiver 810 is configured to obtain a symbol sequence; and the processor 820 is configured to demodulate and decode the symbol sequence to obtain K information bits.

In this embodiment of this application, for descriptions of the first bit sequence, the second bit sequence, the K information bits, the m sub-blocks, the first polar code encoding, the second polar code encoding, and the like, refer to the descriptions in the foregoing method embodiment. Details are not described herein again.

It may be understood that for specific descriptions of the processor and the transceiver, refer to the descriptions of the processing unit and the input/output unit shown in FIG. 7. Details are not described herein again.

In each implementation of the communication apparatus shown in FIG. 8, the transceiver may include a receiver and a transmitter. The receiver is configured to perform a receiving function (or operation), and the transmitter is configured to perform a transmitting function (or operation). The transceiver is configured to communicate with another device/apparatus through a transmission medium.

Optionally, the communication apparatus 80 may further include one or more memories 830, configured to store program instructions and/or data. For example, FIG. 8 shows an example in which a memory stores computer-executable instructions and a reliability sequence, but should not be construed as a limitation on this embodiment of this application. The memory 830 is coupled to the processor 820. The coupling in this embodiment of this application is indirect coupling or a communication connection between apparatuses, units, or modules for information exchange between the apparatuses, the units, or the modules, and may be in an electrical form, a mechanical form, or other forms. The processor 820 may cooperate with the memory 830. The processor 820 may execute the program instructions stored in the memory 830. Optionally, at least one of the one or more memories may be integrated with the processor. For example, the memory 830 may store a reliability sequence or the like.

A specific connection medium among the transceiver 810, the processor 820, and the memory 830 is not limited in this embodiment of this application. In this embodiment of this application, the memory 830, the processor 820, and the transceiver 810 are connected by using a bus 840 in FIG. 8. The bus is denoted by a thick line in FIG. 8. A manner of connection between other components is merely an example for description, and cannot be construed as a limitation. The bus may be classified into an address bus, a data bus, a control bus, and the like. For ease of representation, only one bold line is used to represent the bus in FIG. 8, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, a discrete hardware component, or the like, and may implement or execute the method, steps, and logical block diagrams disclosed in embodiments of this application. The general-purpose processor may be a microprocessor, or may be any conventional processor or the like. The steps of the method disclosed with reference to embodiments of this application may be directly executed and accomplished by a hardware processor, or may be executed and accomplished by a combination of hardware in the processor and a software module.

In this embodiment of this application, the memory may include but is not limited to a nonvolatile memory, for example, a hard disk drive (HDD) or a solid-state drive (solid-state drive, SSD), a random access memory (RAM), an erasable programmable read-only memory (Erasable Programmable ROM, EPROM), a read-only memory (ROM), a compact disc read-only memory (CD-ROM), or the like. The memory is any storage medium that can be used to carry or store program code in a form of an instruction or a data structure and that can be read from and/or written into by a computer (for example, the communication apparatus shown in this application). However, this is not limited thereto. The memory in this embodiment of this application may alternatively be a circuit or any other apparatus that can implement a storage function, and is configured to store the program instructions and/or data.

When the communication apparatus is a terminal device, a processing process of the processor and the transceiver may be as follows:

The processor 820 is mainly configured to process a communication protocol and communication data, control the entire communication apparatus, execute a software program, and process data of the software program. The memory 830 is mainly configured to store the software program and data. The transceiver 810 may include a control circuit and an antenna. The control circuit is mainly configured to: perform conversion between a baseband signal and a radio frequency signal, and process the radio frequency signal. The antenna is mainly configured to receive and send a radio frequency signal in a form of an electromagnetic wave. An input/output apparatus, such as a touchscreen, a display, or a keyboard, is mainly configured to receive data input by a user and output data to a user.

After the communication apparatus is powered on, the processor 820 may read the software program in the memory 830, interpret and execute instructions of the software program, and process the data of the software program. When data is sent wirelessly, the processor 820 performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form to the outside. When data is sent to the communication apparatus, the radio frequency circuit receives a radio frequency signal through the antenna, converts the radio frequency signal into a baseband signal, and outputs the baseband signal to the processor 820. The processor 820 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that the communication apparatus shown in this embodiment of this application may have more components and the like than those in FIG. 8. This is not limited in this embodiment of this application. The method performed by the processor and the transceiver are merely examples. For specific steps performed by the processor and the transceiver, refer to the method described above.

Figure 9:
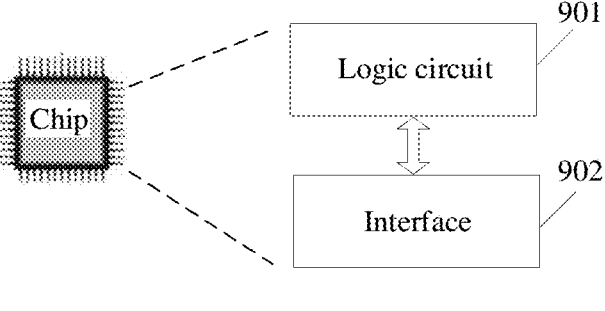

In another possible implementation, in the communication apparatus shown in FIG. 7, the processing unit 701 may be one or more logic circuits, and the input/output unit 702 may be an input/output interface, which is also referred to as a communication interface, an interface circuit, an interface, or the like. Alternatively, the input/output unit 702 may be a sending unit and a receiving unit. The sending unit may be an output interface, and the receiving unit may be an input interface. Alternatively, the sending unit and the receiving unit are integrated into one unit, for example, an input/output interface. As shown in FIG. 9, a communication apparatus shown in FIG. 9 includes a logic circuit 901 and an interface 902. In other words, the foregoing processing unit 701 may be implemented through the logic circuit 901, and the input/output unit 702 may be implemented through the interface 902. The logic circuit 901 may be a chip, a processing circuit, an integrated circuit or a system on chip (SoC) chip, or the like. The interface 902 may be a communication interface, an input/output interface, a pin, or the like. For example, FIG. 9 is described with an example in which the communication apparatus is a chip. The chip includes the logic circuit 901 and the interface 902.

In this embodiment of this application, the logic circuit and the interface may further be coupled to each other. A specific connection manner of the logical circuit and the interface is not limited in this embodiment of this application.

For example, when the communication apparatus is configured to perform the method, function, or step performed by the transmit-end device, the interface 902 is configured to input a first bit sequence; the logic circuit 901 is configured to: map K information bits included in the first bit sequence to m sub-blocks, and perform first polar code encoding on the m sub-blocks to obtain a second bit sequence; and perform modulation based on the second bit sequence to obtain a symbol sequence; and the interface 902 is further configured to output the symbol sequence.

For example, the logic circuit 901 is specifically configured to: perform second polar code encoding on each of the m sub-blocks to obtain m sub-polar codes; and obtain the second bit sequence based on the m sub-polar codes.

It may be understood that the interface shown above in this application is configured to input to-be-processed data, and the to-be-processed data may include the first bit sequence. In this case, the logic circuit may process the first bit sequence to obtain the symbol sequence. In other words, the processed data may include the symbol sequence.

For example, when the communication apparatus is configured to perform the method, function, or step performed by the receive-end device, the interface 902 is configured to obtain a symbol sequence; and the logic circuit 901 is configured to demodulate and decode the symbol sequence to obtain K information bits. In other words, the processed data includes the K information bits.

It may be understood that the interface shown above in this application is configured to input to-be-processed data, and the to-be-processed data may include the symbol sequence. In this case, the logic circuit may process the symbol sequence to obtain the K information bits. After obtaining the K information bits, the interface may output the K information bits to another apparatus (for example, another chip in the receive-end device) in the receive-end device. Alternatively, the interface does not send the K information bits to another chip. This is not limited in this embodiment of this application.

Optionally, the communication apparatus may further include a memory (not shown in FIG. 9). The memory may be configured to store a reliability sequence or the like.

It may be understood that the communication apparatus shown in this embodiment of this application may implement the method provided in embodiments of this application in a form of hardware or in a form of software. This is not limited in this embodiment of this application.

In this embodiment of this application, for descriptions of the first bit sequence, the second bit sequence, the K information bits, the m sub-blocks, the first polar code encoding, the second polar code encoding, and the like, refer to the descriptions in the foregoing method embodiment. Details are not described herein again.

For specific implementations of the embodiment shown in FIG. 9, refer to the foregoing embodiments. Details are not described herein again.

An embodiment of this application further provides a wireless communication system. The wireless communication system includes a transmit-end device and a receive-end device. The transmit-end device and the receive-end device may be configured to perform the method in any one (for example, embodiment in FIG. 4*a*) of the embodiments.

In addition, this application further provides a computer program. The computer program is used to implement operations and/or processing performed by the transmit-end device in the method provided in this application.

This application further provides a computer program. The computer program is used to implement operations and/or processing performed by the receive-end device in the method provided in this application.

This application further provides a computer-readable storage medium. The computer-readable storage medium stores computer code. When the computer code is run on a computer, the computer is enabled to perform operations and/or processing performed by the transmit-end device in the method provided in this application.

This application further provides a computer-readable storage medium. The computer-readable storage medium stores computer code. When the computer code is run on a computer, the computer is enabled to perform operations and/or processing performed by the receive-end device in the method provided in this application.

This application further provides a computer program product. The computer program product includes computer code or a computer program. When the computer code or the computer program is run on a computer, operations and/or processing performed by the transmit-end device in the method provided in this application are/is performed.

This application further provides a computer program product. The computer program product includes computer code or a computer program. When the computer code or the computer program is run on a computer, operations and/or processing performed by the receive-end device in the method provided in this application are/is performed.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may also be connection in an electrical form, a mechanical form, or other forms.

The units described as separate parts may or may not be physically separate, and parts displayed as units may or may not be physical units, may be located in one position, or may be distributed on a plurality of network units. Some or all of the units may be selected based on actual requirements to achieve the technical effects of the solutions provided in embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a storage medium. Based on such an understanding, the technical solutions of this application, or the part contributing to the conventional technology, or all or some of the technical solutions may be implemented in a form of a software product. The computer software product is stored in a readable-storage medium, and includes several instructions for instructing a computer device (which may be a personal computer, a server, a network device, or the like) to perform all or some of the steps of the method described in embodiments of this application. The readable storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An encoding and modulation method, wherein the method comprises:
   obtaining a first bit sequence, wherein the first bit sequence comprises K information bits, and K is an integer greater than 1;
   mapping the K information bits to m sub-blocks;
   performing first polar code encoding on the m sub-blocks to obtain a second bit sequence, wherein a quantity of information bits of the K information bits comprised in a first sub-block of the m sub-blocks is obtained based on a value of K and a code rate R of the first bit sequence, m is a modulation order of the first bit sequence, m is an integer equal to or greater than 1, a length of the second bit sequence is N, and N is an integer greater than 1;
   performing modulation based on the second bit sequence to obtain a symbol sequence; and
   outputting the symbol sequence.

2. The method according to claim 1, wherein the performing first polar code encoding comprises:
   performing second polar code encoding on each of the m sub-blocks to obtain m sub-polar codes; and
   obtaining the second bit sequence based on the m sub-polar codes.

3. The method according to claim 1, wherein positions of the information bits in the first sub-block are determined based on a reliability sequence having a same length as the first sub-block.

4. The method according to claim 1, wherein the quantity of information bits comprised in the first sub-block is less than or equal to a quantity of non-punctured of the K information bits or non-shortened information bits of the K information bits.

5. The method according to claim 1, wherein a quantity $u^j$ of information bits of the K information bits comprised in a j sub-block of the m sub-blocks meets the following formula:

$$u^j = \begin{cases} \lceil K \times R_j \rceil, j = m, m-1, \ldots, 2 \\ K - \sum_{i=2}^{i=m} u^i, j = 1 \end{cases},$$

wherein $R_j$ represents a code rate allocation function of the $j^{th}$ sub-block, $R_j$ is determined based on the code rate R, and $R_1 + R_2 + \ldots + R_m = 1$.

6. The method according to claim 5, wherein the code rate allocation function $R_1$ of the $j^{th}$ sub-block meets the following formula:

$$R_j = p_n \times R^n + p_{n-1} \times R^{n-1} + \ldots + p_1 \times R^1 + p_0 \times R^0, \text{ wherein}$$

n is an integer, $R^n$ represents R raised to the power of n, and $p_n$ is a constant.

7. The method according to claim 5, wherein in response to m=2, the code rate allocation function R of the j sub-block meets the following formula:

$$R_j = p_n \times R^n + p_{n-1} \times R^{n-1} + \ldots + p_1 \times R^1 + p_0 \times R^0, \text{ wherein}$$

n is an integer, $R^n$ represents R raised to the power of n, and $p_n$ is a constant.

8. The method according to claim 6, wherein in response to m=2, a code rate allocation function of a $2^{nd}$ sub-block of the m sub-blocks meets the following formula:
   in response to n=3, $R_2 = p_3 \times R^3 + p_2 \times R^2 \times R^1 + p_0 \times R^0$, wherein
   $p_3 = 0.6855$, $p_2 = -0.9543$, $p_1 = -0.2042$, and $p_0 1.011$; or $p_3 = 0.8462$, $p_2 = -1.704$, $p_1 = 0.4165$, and $p_0 = 0.9453$;
   in response to n=4, $R_2 = p_4 \times R^4 + p_3 \times R^3 + p_2 \times R^2 + p_1 \times R^1 + p_0 \times R^0$, wherein
   $p_4 = -0.8099$, $p_3 = 2.305$, $p_2 = -0.2048$, $p_1 = 0.0796$, and $p_0 = 0.989$; or $p_4 = 0.817$, $p_3 = -0.7891$, $p_2 = -0.5997$, $p_1 = 0.1299$, and $p_0 = 0.9679$;
   in response to n=2, $R_2 = p_2 \times R^2 + p_1 \times R^1 + p_0 \times R^0$, wherein
   $p_2 = 0.07398$, $p_1 = -0.6434$, and $p_0 = 1.06$; or $p_2 = -0.4346$, $p_1 = -0.1256$, and $p_0 = 1.005$; and
   in response to n=1, $R_2 = p_1 \times R^1 + p_0 \times R^0$, wherein
   $p_1 = -0.5697$, and $p_0 = 1.046$; or $p_1 = -0.5602$, and $p_0 = 1.086$.

9. A demodulation and decoding method, wherein the method comprises:
   obtaining a symbol sequence, wherein the symbol sequence is obtained by performing modulation based on a second bit sequence, a length of the second bit sequence is N, N is an integer greater than 1, the second bit sequence is a bit sequence obtained by mapping K information bits comprised in a first bit sequence to m sub-blocks;

performing first polar code encoding on the m sub-blocks, a quantity of information bits of the K information bits comprised in a first sub-block of the m sub-blocks is obtained based on K and a code rate R of the first bit sequence, m is a modulation order of the first bit sequence, and m is an integer equal to or greater than 1; and demodulating and decoding the symbol sequence to obtain the K information bits.

10. The method according to claim 9, wherein the second bit sequence is further obtained based on m sub-polar codes that are obtained by mapping the K information bits to the m sub-blocks and performing second polar code encoding on each of the m sub-blocks.

11. The method according to claim 9, wherein a position of each information bit of the information bits in the first sub-block is determined based on a reliability sequence having a same length as the first sub-block.

12. The method according to any one of claim 9, wherein the quantity of information bits comprised in the first sub-block is less than or equal to a quantity of non-punctured or non-shortened information bits.

13. The method according to any one of claim 9, wherein a quantity u J of information bits comprised in a $j^{th}$ sub-block of the m sub-blocks meets the following formula:

$$u^j = \begin{cases} \lceil K \times R_j \rceil, & j = m, m-1, \dots, 2 \\ K - \sum_{i=2}^{i=m} u^i, & j = 1 \end{cases},$$

wherein $R_j$ represents a code rate allocation function of the $j^{th}$ sub-block, $R_j$ is determined based on the code rate R, and $R_1 + R_2 + \dots + R_m = 1$.

14. The method according to claim 13, wherein the code rate allocation function $R_j$ of the $j^{th}$ sub-block meets the following formula:

$$R_j = p_n \times R^n + p_{n-1} \times R^{n-1} + \dots + p_1 \times R^1 + p_0 \times R^0, \text{ wherein}$$

n is an integer, $R^n$ represents R raised to the power of n, and $p_n$ is a constant.

15. The method according to claim 13, wherein in response to m=2, the code rate allocation function $R_j$ of the $j^{th}$ sub-block meets the following formula:

$$R_j = p_n \times R^n + p_{n-1} \times R^{n-1} + \dots + p_1 \times R^1 + p_0 \times R^0, \text{ wherein}$$

n is an integer, $R^n$ represents R raised to the power of n, and $p_n$ is a constant.

16. The method according to claim 14, wherein in response to m=2, a code rate allocation function of a $2^{nd}$ sub-block of the m sub-blocks meets the following formula:

in response to n=3, $R_2 = p_3 \times R^3 + p_2 \times R^2 + p_1 \times R^1 + p_0 \times R^0$, wherein $p_3 = 0.6855$, $p_2 = -0.9543$, $p_1 = -0.2042$, and $p_0 1.011$; or $p_3 = 0.8462$, $p_2 = -1.704$, $p_1 = 0.4165$, and $p_0 = 0.9453$;

in response to n=4, $R_2 = p_4 \times R^4 + p_3 \times R^3 + p_2 \times R^2 + p_1 \times R^1 + p_0 \times R^0$, wherein $p_4 = -0.8099$, $p_3 = 2.305$, $p_2 = -0.2048$, $p_1 = 0.0796$, and $p_0 = 0.989$; or $p_4 = 0.817$, $p_3 = -0.7891$, $p_2 = -0.5997$, $p_1 = 0.1299$, and $p_0 = 0.9679$;

in response to n=2, $R_2 = p_2 \times R^2 + p_1 \times R^1 + p_0 \times R^0$, wherein $p_2 = 0.07398$, $p_1 = -0.6434$, and $p_0 = 1.06$; or $p_2 = -0.4346$, $p_1 = -0.1256$, and $p_0 = 1.005$; and in response to n=1, $R_2 = p_1 \times R^1 + p_0 \times R^0$, wherein $p_1 = -0.5697$, and $p_0 = 1.046$; or $p_1 = -0.5602$, and $p_0 = 1.086$.

17. A communication apparatus, comprising:

a processor; and a memory configured to store instructions for causing the processor to implement the method according to claim 1.

18. The communication apparatus according to claim 17, wherein the processor is further configured to execute the instructions for performing first polar code encoding by:

performing second polar code encoding on each of the m sub-blocks to obtain m sub-polar codes; and obtaining the second bit sequence based on the m sub-polar codes.

19. The communication apparatus according to claim 17, wherein positions of the information bits in the first sub-block are determined based on a reliability sequence having a same length as the first sub-block.

20. The communication apparatus according to claim 17, wherein the quantity of information bits comprised in the first sub-block is less than or equal to a quantity of non-punctured of the K information bits or non-shortened information bits of the K information bits.

* * * * *